United States Patent
Aoki et al.

(10) Patent No.: US 7,988,371 B2
(45) Date of Patent: Aug. 2, 2011

(54) CAMERA MODULE

(75) Inventors: Susumu Aoki, Ibaraki (JP); Tsuyoshi Maro, Ibaraki (JP)

(73) Assignee: Hitachi Maxell, Ltd., Ibaraki-Shi (JP)

( * ) Notice: Subject to any disclaimer, the term of this patent is extended or adjusted under 35 U.S.C. 154(b) by 1116 days.

(21) Appl. No.: 11/701,375

(22) Filed: Feb. 2, 2007

(65) Prior Publication Data

US 2007/0183773 A1 Aug. 9, 2007

(30) Foreign Application Priority Data

Feb. 3, 2006 (JP) ................................ 2006-026871
Apr. 28, 2006 (JP) ................................ 2006-126994

(51) Int. Cl.
*G03B 17/00* (2006.01)
*H04N 5/225* (2006.01)
*G02B 7/02* (2006.01)

(52) U.S. Cl. ................ 396/529; 348/340; 359/820

(58) Field of Classification Search ............ 396/529, 396/820; 348/340, 342; 359/819, 822, 823
See application file for complete search history.

(56) References Cited

U.S. PATENT DOCUMENTS

| | | | | |
|---|---|---|---|---|
| 2004/0239794 A1* | 12/2004 | Saito et al. | ................ | 348/340 |
| 2006/0109367 A1* | 5/2006 | Hirooka | ................ | 348/340 |
| 2006/0227236 A1 | 10/2006 | Pak | | |
| 2007/0091198 A1* | 4/2007 | Watanabe et al. | ............. | 348/340 |
| 2007/0120050 A1* | 5/2007 | Sawahata et al. | ............. | 250/239 |

FOREIGN PATENT DOCUMENTS

| | | |
|---|---|---|
| JP | A-63-062266 | 3/1988 |
| JP | A 2002-185827 | 6/2002 |
| JP | A 2003-006908 | 1/2003 |
| JP | A 2004-053879 | 2/2004 |
| JP | A 2004-065574 | 3/2004 |
| JP | A 2005-347397 | 12/2005 |
| JP | A-2006-080961 | 3/2006 |

OTHER PUBLICATIONS

Notice of Reason for Rejection issued in Japanese Patent Application No. 2006-026871; mailed Oct. 5, 2010; with English-language translation.

Apr. 19, 2011 Japanese Office Action issued in JP-2006-126994 (with Translation).

* cited by examiner

*Primary Examiner* — Rochelle-Ann J Blackman

(74) *Attorney, Agent, or Firm* — Oliff & Berridge, PLC

(57) ABSTRACT

A camera module includes a mount for holding a lens directly or indirectly, a cover plate glass with transparency fixed to the mount. A solid-state imaging device is mounted on the cover plate glass. The cover plate contacts a plurality of ribs formed in the mount, and the mount and the cover plate are positioned.

38 Claims, 14 Drawing Sheets

CAMERA MODULE

BACKGROUND OF THE INVENTION

1. Field of the Invention

The present invention relates to a camera module.

2. Description of Related Art

In recent years, a camera module having a lens and a solid-state imaging device is mounted on various devices including a cellular phone. The solid-state imaging device is directly or indirectly fixed to a mount of the camera module. The imaging quality of the camera module largely varies depending on a relative position of the solid-state imaging device and the lens. Accordingly it is important to accurately position the solid-state imaging device and the lens.

An example of a configuration of a camera module is disclosed in Japanese Unexamined Patent Application Publication No. 2005-347397. In the camera module disclosed in Japanese Unexamined Patent Application Publication No. 2005-347397, a solid-state imaging device is formed over a semiconductor substrate. The solid-state imaging device is sealed by a spacer or a cover glass disposed over the semiconductor substrate. A lens holder is mounted over the cover glass. A concave portion is formed in the lens holder. The cover glass is fit to the concave portion of the lens holder, and fixed to the lens holder by an adhesive.

In the configuration shown in Japanese Unexamined Patent Application Publication No. 2005-347397, the cover glass is fit to the concave portion of the lens holder as described in the foregoing. To accurately position the cover glass and the lens holder, the surface contacting the cover glass of the lens holder should be flat, and the flatness of the surface needs to be improved. Without improving the flatness in the surface of the concave portion, the solid-state imaging device and the lens can be positioned incorrectly, resulting to largely change the imaging quality. The lens holder is usually formed from synthetic resin. It is difficult to improve the flatness.

Although not disclosed in the Japanese Unexamined Patent Application Publication No. 2005-347397, an optical filter may be provided between the lens and the solid-state imaging device. Generally the optical filter is fixed to the lens holder etc by an adhesive, however as the adhesive adheres to the light-receiving portion such as the cover glass etc, the imaging quality is decreased.

Further, a structure is suggested in which a silicon chip (a solid-state imaging device) and a lens holder are bonded and fixed to a substrate by an adhesive. However in this case, it is difficult to position the lens and the solid-state imaging device due to irregularity in the adhesive and in cutting the silicon chip.

SUMMARY OF THE INVENTION

The present invention has been accomplished with a view to solving the aforementioned problems, and an object of the invention is to provide a camera module which accurately positions a solid-state imaging device and a lens, and which has a high imaging quality.

According to an aspect of the present invention, there is provided a camera module that includes an imaging device that converts light made incident on imaging area into electric signals; a cover plate that has a first plane to which the imaging device is fixed and a second plane that is opposite to the first plane, and transmits an incident light from the second plane to the imaging area of the imaging device; a lens that collects the incident light to the imaging area; a mount that holds a lens directly or indirectly and houses the cover plate; and a substrate that supports the cover plate and to which electrical signals output from the imaging device are inputted; wherein the second plane of the cover plate is abutted on an inner surface of the mount and then the positioning between the lens and the imaging device is set.

The second plane of the cover plate is preferably abutted on the inner surface of the mount through a plurality of projecting portions formed on the inner surface of the mount.

The imaging device is connected to the cover plate through a plurality of solder bumps. The projecting portions are preferably provided on three or more places of the mount.

The mount preferably includes a first surface where the cover plate is mounted on and a second surface where an optical filter is mounted on.

A level of the first surface is different from a level of the second surface, and a recessed potion is provided between the first surface and the second surface.

The mount is fixed to the substrate via an adhesive between a lower end of an outer peripheral wall of the mount and the substrate, and a plurality of grooves are provided on the lower end of the outer peripheral wall, the plurality of grooves extend along a direction, which crosses an extending direction of the lower end of the outer peripheral wall.

The cover plate is preferably a plate of cover glass.

An adhesive is preferably provided between the lower end of an outer peripheral wall of the mount and the substrate.

An extended portion that extends towards a center of the mount is preferably provided inside the mount, the inner surface where the cover plate is abutted on is provided on the extended portion.

The camera module preferably further comprises a lens holder that holds the lens and includes the mount integrated thereto or provided separately.

The lens and the lens holder are preferably formed of a resin material having a heat-resistant temperature higher than a heating temperature in a mounting process of electric components.

The lens and the lens holder are preferably formed of a resin material having a heat-resistant temperature of 200° C. or more.

The material of the lens is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

The material of the lens holder is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or a resin material such as a polyamid, a polyimid, a polyamid-imid, a polyether sulfone, a polyetherimide, a polyarylate, a polyphthalamide, a polyphthalimid, and a liquid crystal polymer.

A distance H, which is a distance between a lens-side end of the lens holder and a lens-side plane of the cover plate, is set to 3.5 mm or less, and a following formula is preferably satisfied; $0.05 \leq S/(H \times H)$, where S is an area of a connecting portion of the lens and the cover plate, and H is the distance between a lens-side end of the lens holder and a lens-side plane of the cover plate.

The distance H, which is a distance between a lens-side end of the lens holder and a lens-side plane of the cover plate, is set to 3.5 mm or less, and a following formula is preferably satisfied; $S/(H \times H) \leq 1$, where S is the area of the connecting portion of the lens and the cover plate, and H is the distance between a lens-side end of the lens holder and a lens-side plane of the cover plate.

With a coefficient of thermal expansion of a material of the lens to be $\alpha 1$ and a coefficient of thermal expansion of a material of the lens holder to be $\alpha 2$, a relationship of $1<\alpha 1/\alpha 2 \leqq 20$ is preferably satisfied.

With a coefficient of thermal expansion of a material of the lens to be $\alpha 1$ and a coefficient of thermal expansion of a material of the lens holder to be $\alpha 2$, a relationship of $1.5<\alpha 1/\alpha 2 \leqq 20$ is preferably satisfied.

With a coefficient of thermal expansion of a material of the lens to be $\alpha 1$ and a coefficient of thermal expansion of a material of the lens holder to be $\alpha 2$, a relationship of $2<\alpha 1/\alpha 2 \leqq 20$ is preferably satisfied.

According to another aspect of the present invention, there is provided a camera module that comprises a substrate module that includes an imaging device having a pixel where photo-electric conversion is conducted; a lens that is formed of a resin material having a heat-resistance temperature higher than a heating temperature in a mounting process of electric components and transfers an image to the imaging device; and a lens holder that is formed of a resin material having a heat-resistance temperature higher than the heating temperature in a mounting process of electric components and holds the lens and being fixed to the substrate module.

The lens and the lens holder preferably have a heat resistance temperature of 250° C. or more.

The material of the lens is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

The material of the lens holder is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or a resin material such as a polyamid, a polyimid, a polyamid-imid, a polyether sulfone, a polyetherimide, a polyarylate, a polyphthalamide, a polyphthalimid, and a liquid crystal polymer.

A distance H, which is a distance between a lens-side end of the lens holder and a lens-side plane of the cover plate, is set to 3.5 mm or less, and a following formula is preferably satisfied; $0.05 \leqq S/(H \times H)$, where S is an area of a connecting portion of the lens and the cover plate, and H is the distance between a lens-side end of the lens holder and a lens-side plane of the cover plate.

The distance H, which is a distance between a lens-side end of the lens holder and a lens-side plane of the cover plate, is set to 3.5 mm or less, and a following formula is satisfied; $S/(H \times H) \leqq 1$, where S is the area of the connecting portion of the lens and the cover plate, and H is the distance between a lens-side end of the lens holder and a lens-side plane of the cover plate.

With a coefficient of thermal expansion of a material of the lens to be $\alpha 1$ and a coefficient of thermal expansion of a material of the lens holder to be $\alpha 2$, a relationship of $1<\alpha 1/\alpha 2 \leqq 20$ is preferably satisfied. With a coefficient of thermal expansion of a material of the lens material to be $\alpha 1$ and a coefficient of thermal expansion of a material of the lens holder material to be $\alpha 2$, a relationship of $1.5<\alpha 1/\alpha 2 \leqq 20$ is preferably satisfied. With a coefficient of thermal expansion of a material of the lens to be $\alpha 1$ and a coefficient of thermal expansion of a material of the lens holder to be $\alpha 2$, a relationship of $2<\alpha 1/\alpha 2 \leqq 20$ is preferably satisfied.

The substrate module preferably further comprises a cover plate having the imaging device being fixed thereto, wherein the cover plate has a transparency and is fixed to the lens holder; and the imaging device is mounted on a surface opposite to a lens-side surface of the cover plate.

According to another aspect of the present invention there is provided a camera module that comprises a substrate module that includes an imaging device having a pixel where photo-electric conversion is conducted; a lens that provides an image to the imaging device; and a lens holder that holds the lens, the lens holder being fixed to the cover plate, wherein the lens and the lens holder are formed of a resin material having a heat-resistance temperature of 200° C. or more.

The lens and the lens holder preferably have a heat-resistance temperature of 250° C. or more.

The material of the lens is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

The material of the lens holder is preferably at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or a resin material such as a polyamid, a polyimid, a polyamid-imid, a polyether sulfone, a polyetherimide, a polyarylate, a polyphthalamide, a polyphthalimid, and a liquid crystal polymer.

A distance H, which is a distance between a lens-side end of the lens holder and a lens-side plane of the cover plate, is set to 3.5 mm or less, and a following formula is preferably satisfied; $0.05 \leqq S/(H \times H)$, where S is an area of a connecting portion of the lens and the cover plate, and H is the distance between a lens-side end of the lens holder and a lens-side plane of the cover plate.

The distance H, which is a distance between a lens-side end of the lens holder and a lens-side plane of the cover plate, is set to 3.5 mm or less, and a following formula is satisfied: $S/(H \times H) \leqq 1$, where S is the area of the connecting portion of the lens and the cover plate, and H is the distance between a lens-side end of the lens holder and a lens-side plane of the cover plate.

With a coefficient of thermal expansion of a material of the lens to be $\alpha 1$ and a coefficient of thermal expansion of a material of the lens holder to be $\alpha 2$, a relationship of $1<\alpha 1/\alpha 2 \leqq 20$ is preferably satisfied. With a coefficient of thermal expansion of a material of the lens material to be $\alpha 1$ and a coefficient of thermal expansion of a material of the lens holder to be $\alpha 2$, a relationship of $1.5<\alpha 1/\alpha 2 \leqq 20$ is preferably satisfied.

With a coefficient of thermal expansion of a material of the lens to be $\alpha 1$ and a coefficient of thermal expansion of a material of the lens holder to be $\alpha 2$, a relationship of $2<\alpha 1/\alpha 2 \leqq 20$ is preferably satisfied.

According to the present invention, it is possible to provide a camera module with a high accuracy in positioning the solid-state imaging device and the lens, and which has a high imaging quality.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

The present invention is described below with reference to embodiments. The present invention, however, is not limited thereto.

First Embodiment

Figure 1:
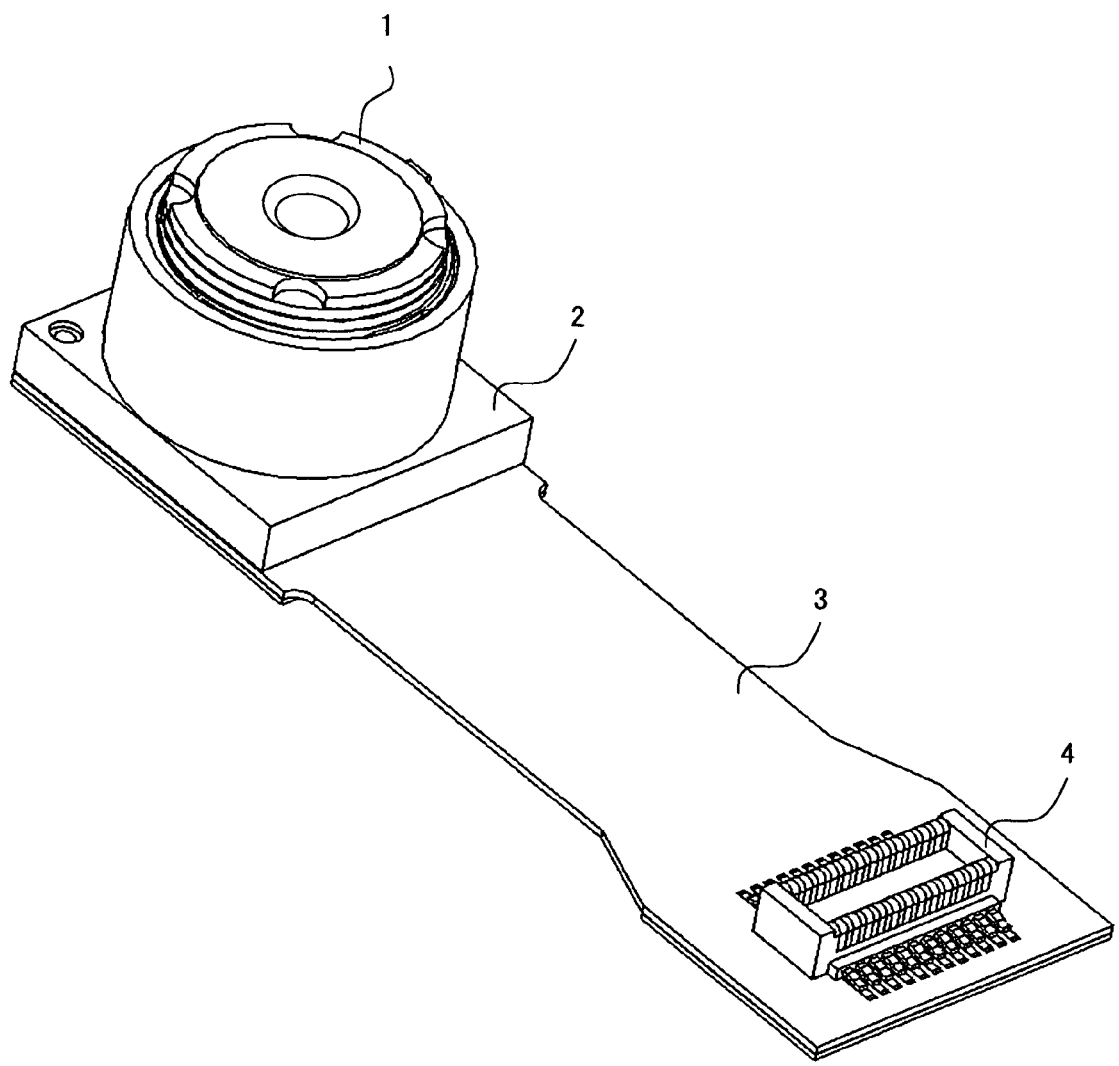
FIG. 1 is a schematic perspective view showing a camera module according to the present invention.
Figure 2:
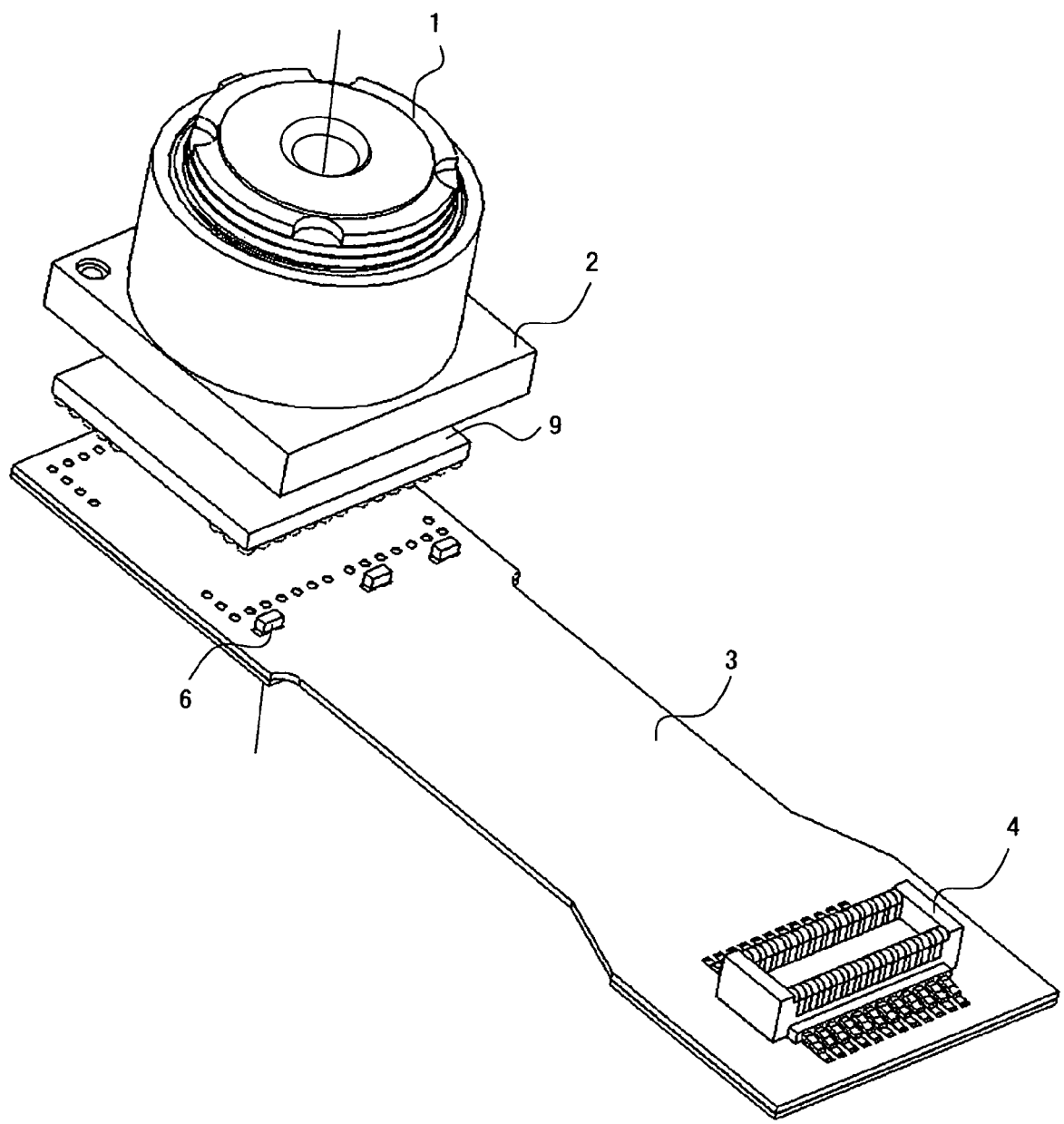
FIG. 2 is a schematic exploded perspective view showing the camera module according to the present invention.
Figure 3:
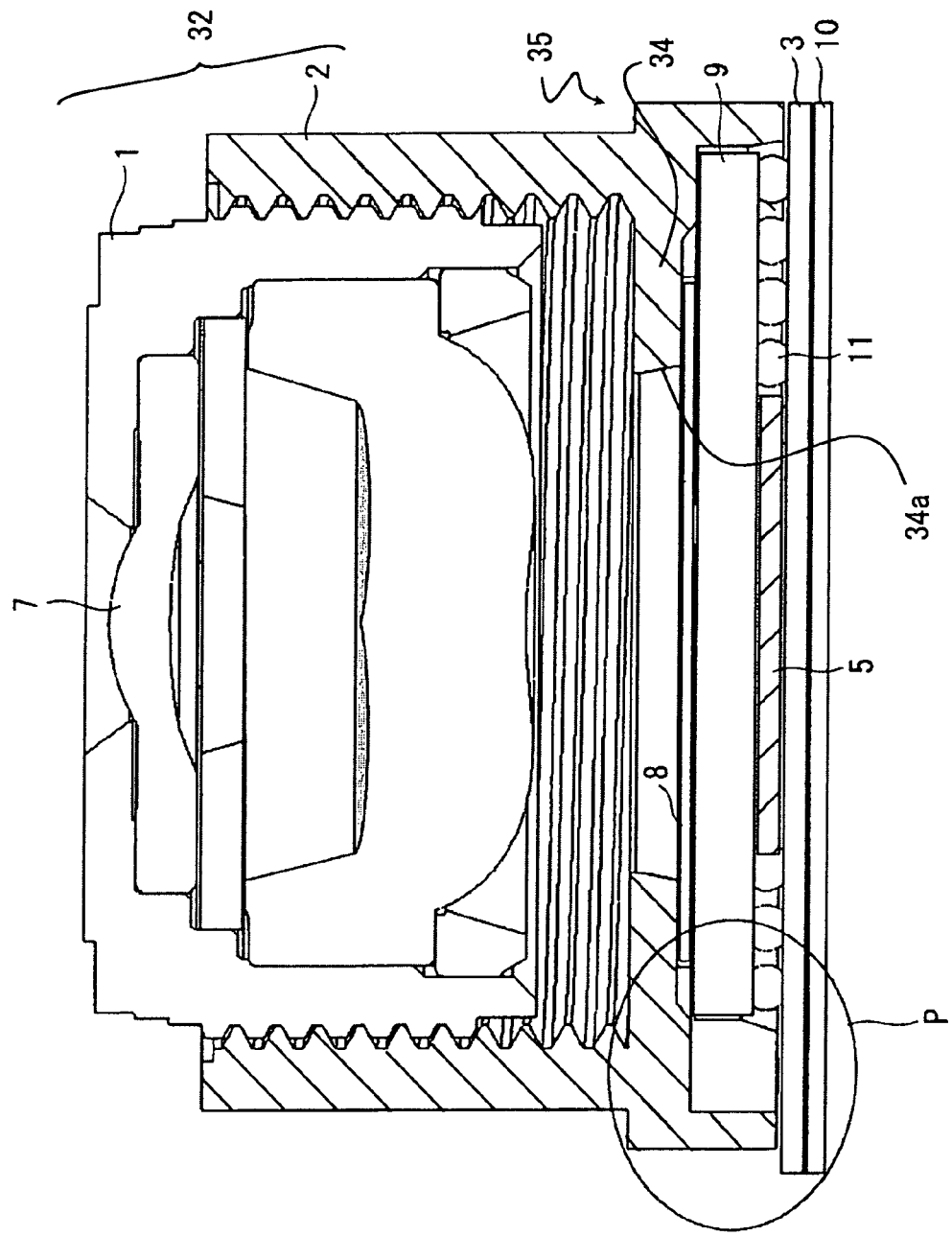
FIG. 3 is a schematic cross-sectional diagram showing the camera module according to the present invention.

FIG. 1 is a perspective view showing the camera module according to the present invention. FIG. 2 is an exploded perspective view showing the camera module. Further, FIG. 3 is a cross-sectional diagram showing the camera module. As shown in FIGS. 1 to 3, the camera module of the present invention includes a lens module 1, a mount 2, a FPC (Flexible Printed Circuit) substrate 3, a connecter 4, a solid-state imaging device 5, a capacitor 6, a lens 7, an optical filter 8, a cover glass (cover plate) 9, a reinforcement sheet 10, and solder balls 11.

The lens module 1 is in a cylinder shape with one or more lenses accurately fixed to an inner peripheral surface thereof. Other than the lens 7, an optical aperture and an O ring may be provided in the lens module 1. A screw structure is provided on an outer peripheral surface of the lens module 1 so that it is screwed with the mount 2. The lens module 1 is formed of a synthetic resin with a light blocking effect such as a black polycarbonate and a polybutylene terephthalate.

The mount 2 is in a cylinder shape. The lens module 1 is screwed to the upper inner peripheral portion of the mount 2 and mounted on the mount 2. The lower outer peripheral surface of the mount 2 is larger than the upper outer peripheral surface of the mount 2, and an extended portion 35 is provided on the mount 2. In this example, the lower portion of the mount 2 is in a square pole shape. It is noted that the mount 2 and a supporting portion for the lens of the lens module 1 may jointly referred to as a lens holder 32. Further, the lens holder 32 may be constituted integrating the mount 2 with the supporting portion for the lens of the lens module 1. Alternatively as in this embodiment, the lens module 32 may be constituted of the mount 2 and the supporting portion for the lens of the lens module 1 separately.

An extended portion 34, which is extended towards the center of the cylinder, is provided on the inner peripheral surface of the mount 2 near the extended portion 35. The extended portion 34 is extended from the inner peripheral surface of the mount 2 and extended along a direction vertical to the optical axis of the lens 7. Further, an opening in a square shape is defined by a top end 34a of the extended portion 34. When viewed from the optical axis of the lens 7, the square opening is provided. The optical filter 8, cover glass 9, and solid-state imaging device 5 are housed below the extended portion 34.

Further, the mount 2 is formed of a synthetic resin with a light blocking effect such as a black polycarbonate and a polybutylene terephthalate.

The FPC substrate 3 is a flexible wiring substrate, with a wiring formed by printing or etching etc over a polyester (PET) film, and the FPC substrate 3, in general, has a flexibility and occupies a small space.

A connector 4 is connected to a terminal of the solid-state imaging device 5 via the FPC substrate 3, and the connector 4 is electrically connected to external devices. In this example, the solid-state imaging device 5 is provided to an end portion of the FPC substrate 3, and the connector 4 is provided to another end portion thereof.

The solid-state imaging device 5 is an image sensor such as a CCD (Charge Coupled Device) or a CMOS (Complementary Metal Oxide Semiconductor). The solid-state imaging device 5 has a CSP (Chip Scale Package) structure. The solid-state imaging device 5 outputs an image signal generated corresponding to a light made incident on the imaging region via the lens 7. The solid-state imaging device 5 is fixed to the cover glass 9. An electrode of the solid-state imaging device 5 is electrically connected to an electrode formed over an exit-side surface of the cover glass 9 via the solder bumps etc. The distance between the solid-state imaging device 5 and the cover glass 9 is determined by the size of a plurality of solder bumps. In other words, the solid-state imaging device 5 and the cover glass 9 are positioned via the solder bumps. As it is easy to control the size of the solder bumps, the solid-state imaging device 5 and the cover glass 9 can be accurately positioned. Further, by using the plurality of solder bumps, the distance between the solid-state imaging device 5 and the cover glass 9 can be averaged. The capacitor 6 is provided on the FPC substrate 3.

The lens 7 is an optical device which collects outside light to the imaging region of the solid-state imaging device 5. Further, the lens 7 may be comprised of one or a plurality of lenses. And the lens 7 is formed of a synthetic resin including a polycarbonate, an olefin, and a silicon resin or a glass for example.

The optical filter 8 is a film member for removing a particular frequency component of the outside light. The optical filter 8 in this example is an infrared cut filter. The optical filter 8 is preferably disposed near the solid-state imaging device 5 in order to suppress the influence of diffuse reflection. In this example, the optical filter 8 is fixed to the mount 2 by an adhesive with being close to the cover glass 9. Note that it is possible to hold the optical filter 8 between the cover glass 9 and the mount 2 instead of adhering the optical filter 8 to the mount 2.

The cover glass 9 is formed of a glass and is a cover in a plate shape with a transparency. The optical filter 8 is disposed over the incident surface (top surface) of the cover glass 9, and the solid-state imaging device 5 is mounted on an exit surface (bottom surface) of the cover glass 9. The main surface (the top surface and the bottom surface) of the cover glass 9 is larger than the solid-state imaging device 5. Over the central part of the main surface of the cover glass 9, the solid-state imaging device 5 is fixed. Specifically, a terminal of the solid-state imaging device 5 is electrically connected via solder bumps etc to a terminal of a wiring pattern formed in a region corresponding to the outside region of an imaging region of the solid-state imaging device 5. Further, a terminal connected to the FPC substrate 3 as well as a terminal connected to the solid-state imaging device 5 is provided in the wiring pattern formed over the bottom surface of the cover glass 9. In this example, the terminal of the FPC substrate 3 and that of the cover glass 9 are connected via the solder balls 11. The cover glass 9 is in a rectangle shape when viewed along with a direction of an optical axis of the lens 7.

The reinforcement sheet 10 is in a plate shape to increase the strength of the flexible FPC substrate 3. The size of the reinforcement sheet 10 is almost same as the outer shape of bottom of the mount 2. The reinforcement sheet 10 is adhered to the FPC substrate 3 corresponding to the position where the mount 2 is disposed. The mount 2 is placed over the reinforcement sheet 10 with the FPC substrate 3 therebetween. The solder ball 11 is used to electrically connect the terminal of the FPC substrate 3 and that of the cover glass 9 as described in the foregoing.

Figure 4:
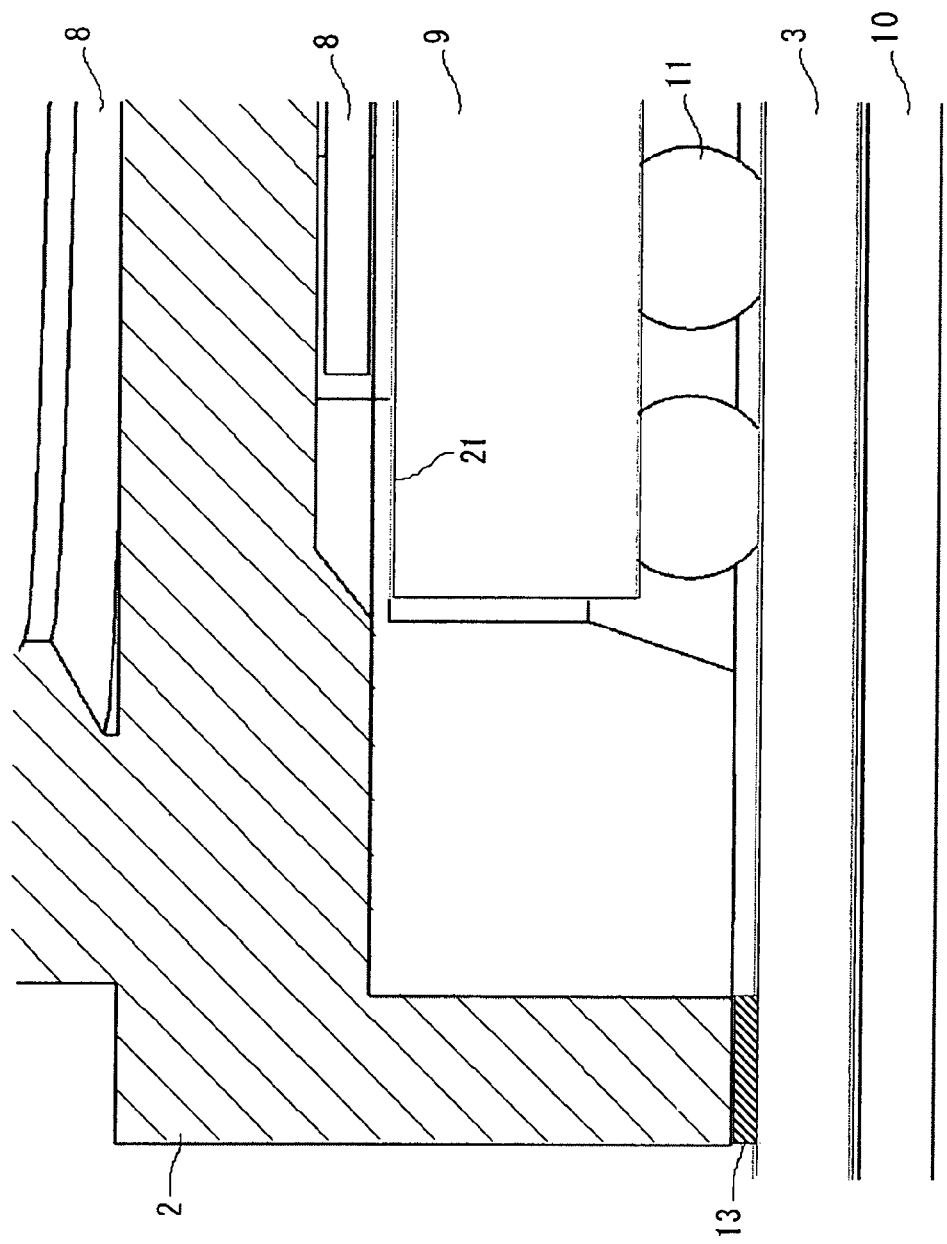
FIG. 4 is a schematic partially enlarged cross-sectional diagram showing the camera module according to the present invention.

FIG. 4 is an enlarged cross-sectional view showing the portion indicated by P in FIG. 3. As shown in FIG. 4, the mount 2 is adhered to the FPC substrate 3 by an adhesive 13. The adhesive 13 is for example an ultraviolet curing or heat curing adhesive. Further, an abutting rib (hereinafter referred to as a rib), which is a projecting portion provided on the inner surface of the mount 2, is described later. The cover glass 9 contacts with the rib 21, and the cover glass 9 and the mount 2 are accurately positioned, and consequently, the lens 7 and the solid-state imaging device 5 can be accurately positioned.

Figure 5:
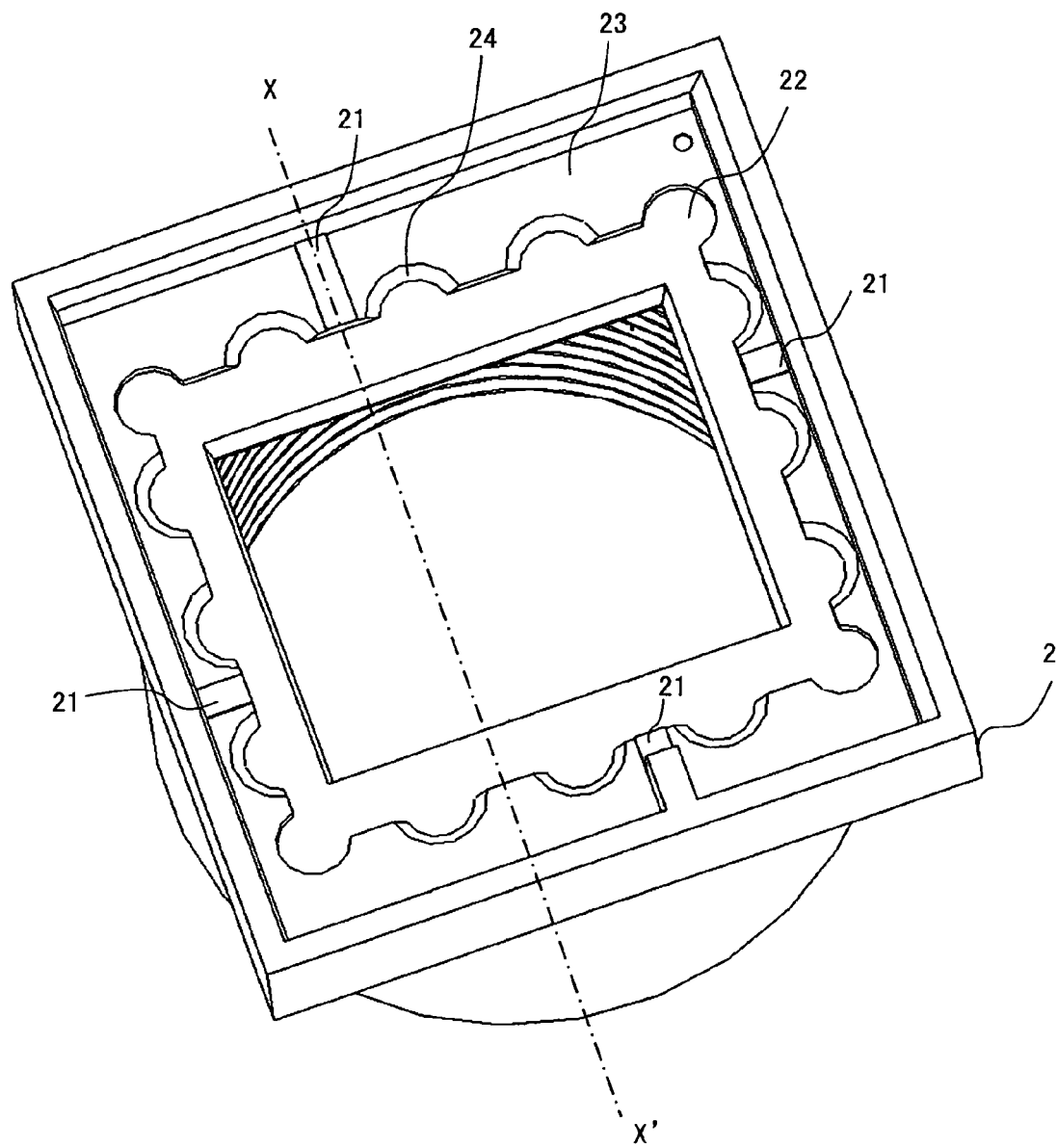
FIG. 5 is a schematic perspective view showing a mount of the camera module according to the present invention.

FIG. 5 is a view showing a mount 2 when viewed from beneath. FIG. 3 corresponds to a cross-sectional diagram taken along the line X-X of FIG. 5. As shown in FIG. 5, a mounting surface 22 for the optical filter 8 and a mounting surface 23 for the cover glass 9 are provided on the inner surface at a bottom of the mount 2. The mounting surface 22 is provided inside the mounting surface 23. A recessed portion 24 is provided between the mounting surfaces 22 and 23. The mounting surface 22 is formed lower than the mounting surface 23 towards an incident side. The mounting surface 22 controls the position of the optical filter. An opening is formed on the mount 2 to purge gas generated from the adhesive.

A plurality of ribs 21 are provided on the mounting surface 23. The ribs 21 are provided at each of four sides of the bottom surface 23 of the mount 2. Four of the ribs 21 in total are formed integral with the mount 2. The number of the ribs 21 does not necessarily have to be four, however it is preferably three or more so that the cover glass 9 is stabled vertical to the lens optical axis. The relative distance from the mounting surface 22 to the top surface of the rib 21 is determined in consideration of the thickness of the optical filter 8 and the thickness of the adhesive that is used to fix the optical filter 8 to the mounting surface of the optical filter 8. The heights of the ribs 21 are determined according to the relative distance. The heights of the ribs 21 are 0.035 mm, for example, from the mounting surface 23 of the cover glass 9.

As described herein, in the present invention, the ribs 21 provided on the mounting surface 23 of the mount 2 is made in contact with the cover glass 9 so as to position the cover glass 9 and the mount 2. Specifically, in this embodiment, the cover glass 9 and the mount 2 are not positioned by contacting the cover glass 9 and the mounting surface 23 of the mount 2. Rather than improving the flatness across the mounting surface 23, it is far easier to accurately manufacture the heights of the ribs 21 to be substantially equal. Therefore, by providing the ribs 21 on the mounting surface 23, it is easier to position the cover glass 9 and the mount 2 each other. Specifically, by contacting the cover glass 9 with the ribs 21, the cover glass 9 and the mount 2 can be accurately positioned to each other. Consequently, the lens 7 and the solid-state imaging device 5 can be accurately positioned. This improves the imaging quality of a camera module.

Figure 6:
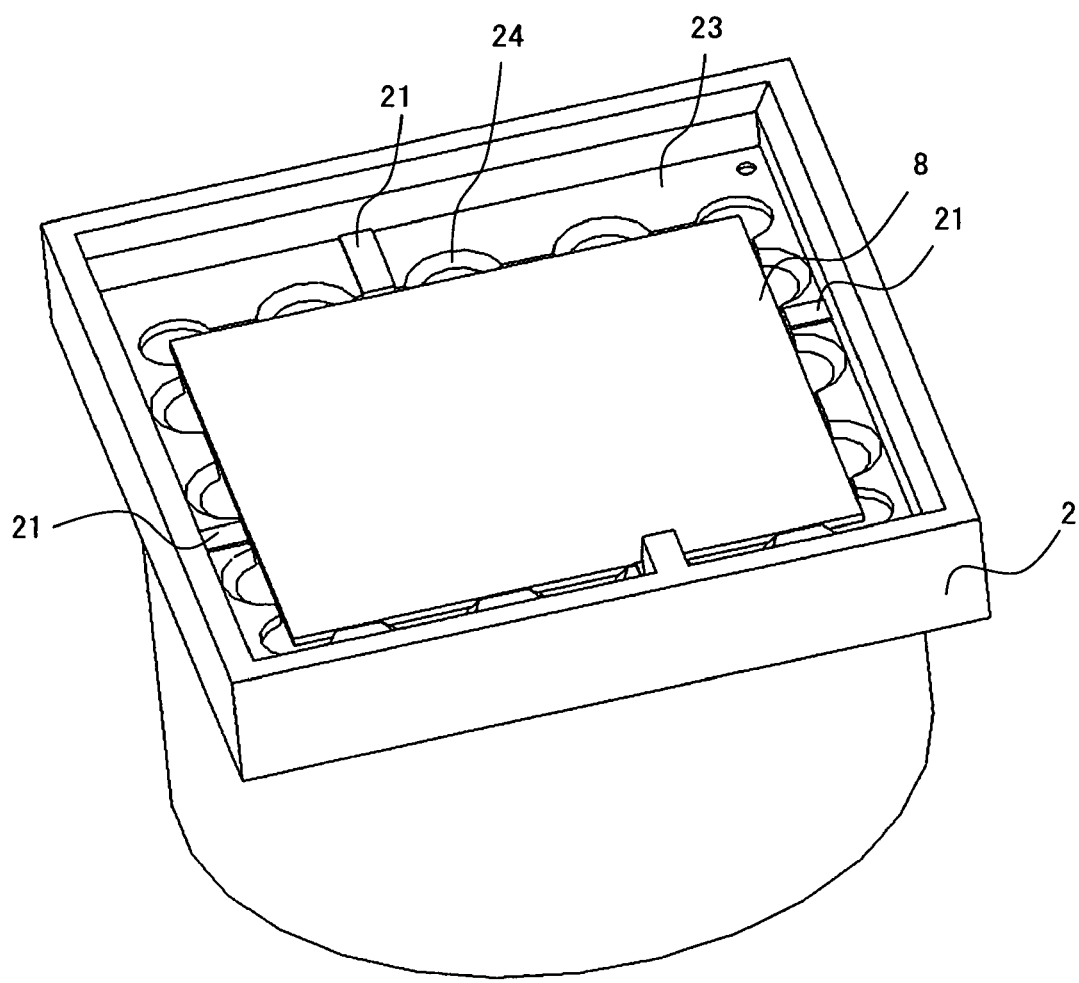
FIG. 6 is a schematic perspective view showing the mount of the camera module with an optical filter mounted thereto according to the present invention.

The recessed portions 24 are formed between the mounting surface 22 and the mounting surface 23. The recessed portions 24 are in semicircular shape. The bottom surfaces of the recessed portions 24 match with the mounting surfaces 22. As shown in FIG. 6, the optical filter 8 is fixed to the mounting surface 22 by an adhesive. The adhesive is applied to the recessed portions 24. Specifically, a liquid adhesive is run down into the recessed portions 24 while the optical filter 8 is mounted on the mounting surface 22. The liquid adhesive runs around the entire peripheral between the optical filter 8 and the mounting surface 22 by the capillarity effect. The adhesive applied between the optical filter 8 and the mounting surface 22 runs horizontally but the extra adhesive runs to the recessed portions 24. By providing the recessed portions 24, which function as regions of refuge for the adhesive, it is possible to prevent the adhesive from running over a region where the incident light passes and thereby decreasing the optical performance.

One of a manufacturing method of the camera module according to the present invention is described hereinafter in detail. Firstly the cover glass 9 having the solid-state imaging device 5 is connected to the FPC substrate 3 via the solder balls 11. The reinforcement sheet 10 is adhered to the rear surface of the FPC substrate 3 in advance. Further, the lens 7 is attached to the mount 2, and the optical filter 8 is adhered by an adhesive. Then the adhesive 13 is applied to a lower end portion (leg) of the mount 2, and the mount 2 is adhered to the FPC substrate 3. At this time the ribs 21 and the cover glass 9 are abutted. By doing this, the cover glass 9 and the mount 2 are positioned to each other by the ribs 21. Further, a gap is provided between the leg of the mount 2 and the FPC substrate 2. The gap is filled with the adhesive 13. Accordingly by the mount 2 and the FPC substrate 3 being adhered, the positioning is not influenced by the ribs 21 abutting the cover glass 9. Furthermore, if the adhesive strength is not good enough only by adhering the lower end portion (leg) of the mount 2 to the FPC substrate 3 by the adhesive 13, the mounting surface 23 including the ribs 21 of the mount 2 may be adhered to the cover glass 9 by the adhesive.

The manufacturing method of the camera module is not limited to the method above. Another manufacturing method of the camera module is described hereinafter in detail with reference to FIGS. 7 and 8.

Furthermore, in the abovementioned manufacturing method, after mounting the cover glass 9 having the solid-state imaging device 5 to the FPC substrate 3 (after a reflow process), the mount 2 having the lens 7 and the optical filter 8 is fixed to the cover glass 9. In the manufacturing method described later, the mount 2 having the lens 7 and the optical filter 8 is fixed to the cover glass 9 before mounting the cover glass 9 having the solid-state imaging device 5 to the FPC substrate 3 (before the reflow process).

Figure 7:
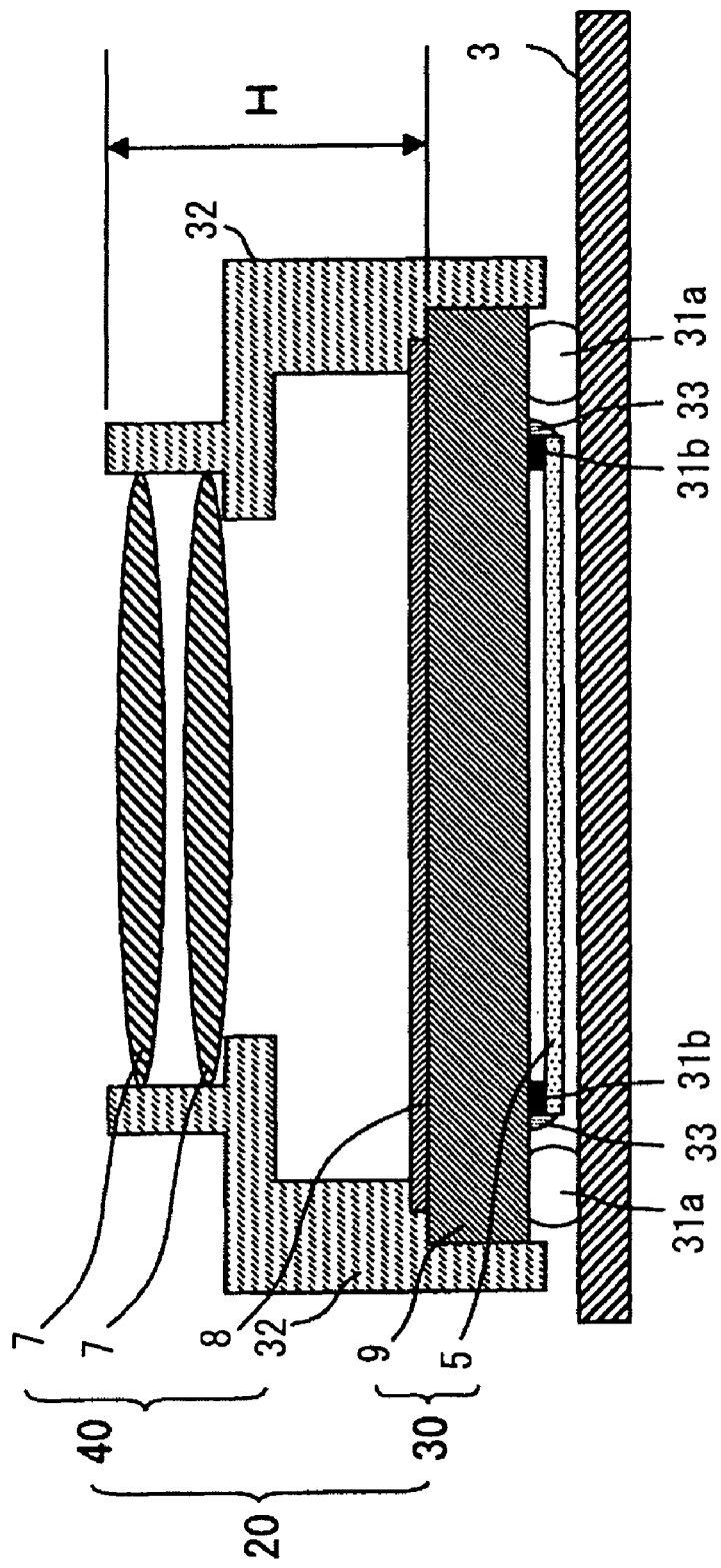
FIG. 7 is a schematic cross-sectional diagram showing the camera module according to the present invention.

FIG. 7 is a schematic cross-sectional view showing the camera module. As shown in FIG. 7, the camera module includes the FPC substrate 3, the cover glass 9, the solid-state imaging device 5, a lens holder 32, the optical filter 8, and the lenses 7. A substrate module 30 is comprised from the cover glass 9 and the solid-state imaging device 5. A lens unit 40 is comprised form the lens holder 32, optical filter 8, and lenses 7. Further, a camera module 20 is comprised from the substrate module 30 and lens unit 40. Furthermore, the lens holder 32 is a member including a supporting portion for the lens of the lens module 1 shown in FIGS. 1 to 3 and the mount 2. The cover glass 9 is in contact with a portion of an inner surface of the lens holder 32, which recesses along a direction that crosses an optical axis of the lenses 7. But it is also possible that the cover glass 9 is in contact with the ribs 21 (not shown) provided on the inner surface of the lens holder 32 as described in the foregoing.

As shown in FIG. 7, the camera module 20 is comprised from the substrate module 30 having the solid-state imaging device 5 and the lens unit 40. By bonding the substrate module 30 to the FPC substrate 3, the entire camera module 20 is bonded to the FPC substrate 3.

Figure 8A:
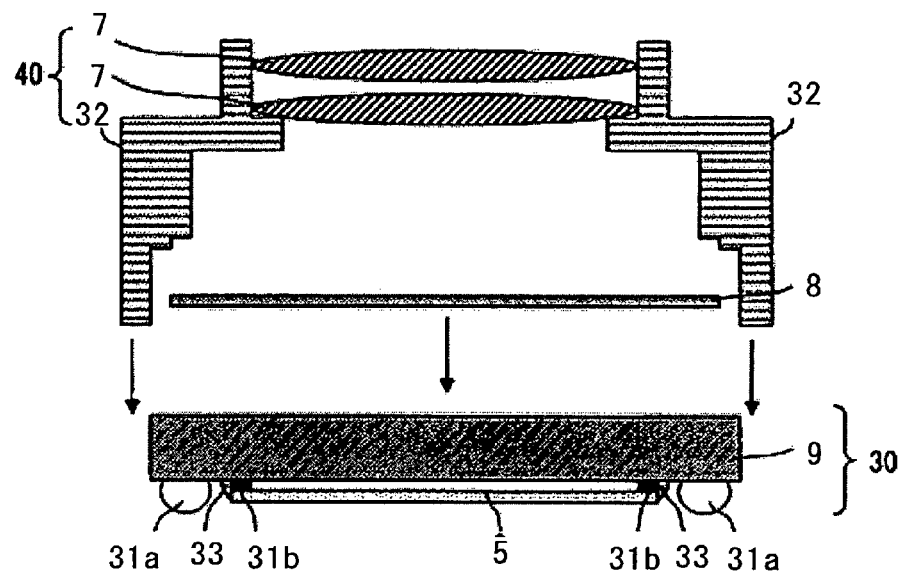
FIGS. 8A to 8C are schematic views explaining another manufacturing method of the camera module according to the present invention.
Figure 8B:
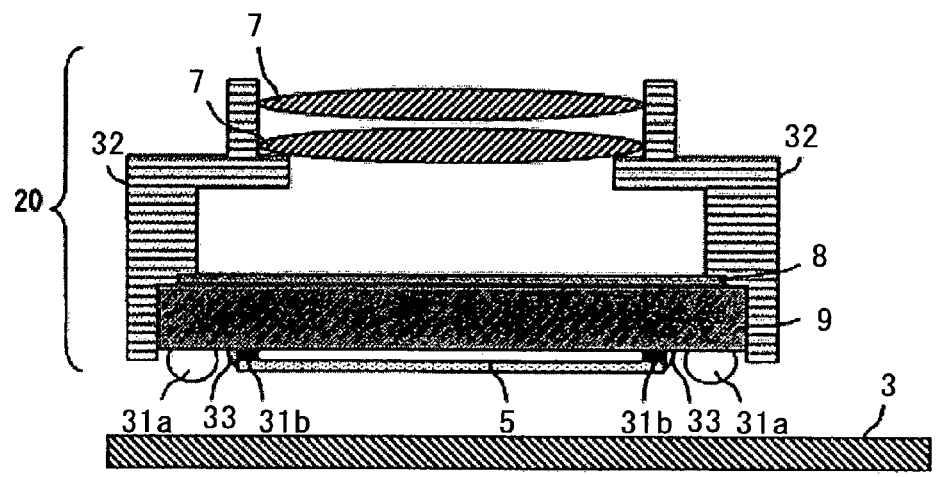
Figure 8C:
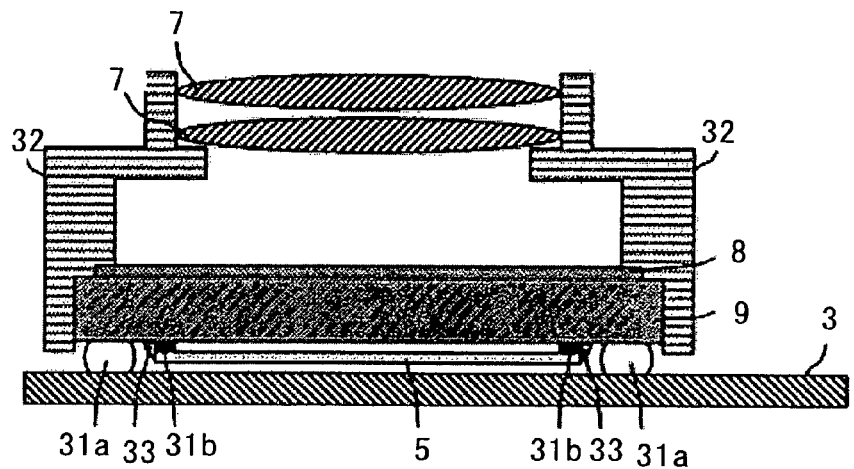

A manufacturing method of the camera module shown in FIG. 7 is described hereinafter in detail with reference to FIGS. 8A to 8C. Firstly as shown in FIG. 8A, camera module 20 is created by assembling the substrate module 30, which is constructed beforehand, and the lens unit 40.

The substrate module 30 is an imaging module having the solid-state imaging device 5, such as a CCD and CMOS which are an imaging device for imaging, bonded over the cover glass 9. A wiring pattern for connections is provided on the cover glass 9. The wiring pattern of the cover glass 9 and the solid-state imaging device 5 are electrically connected by a solder bump 31b. The surrounding area of the solid-state imaging device 5 is sealed by a sealer 33. A light-receiving portion, in which many pixels performing photoelectrical conversions are provided in lattice, is provided on the solid-state imaging device 5. Charges stored at each pixel by providing an image to the light-receiving portion (imaging region) of the solid-state imaging device 5 are output as an image signal.

The lens unit 40 includes the lens holder 32 and the lenses 7. The lens holder 32 is in a cylinder shape. The outer surface of the lens 7 is abutted to the internal surface of the lens holder 32. Further, the lenses 7 are fixed to the internal surface of the lens holder 32. A recessed portion or a projecting portion is formed on the outer and inner surface of the lens holder 32. The lenses 7 are held in the upper portion of the lens holder 32. The lens holder 32 is bonded to the cover glass 9 by the adhesive applied to the lower portion thereof. The camera module 20 is formed by the above process. Note that as described in the foregoing, it is possible that the cover glass 9 is in contact with the ribs 21 (not shown) that are provided on the inner surface of the lens holder 32. By doing this, the cover glass 9 and the lens holder 32 (a mount in the lens holder 32) are accurately positioned to each other.

A method of bonding the camera module 20 to the FPC substrate 3 is described hereinafter in detail with reference to FIGS. 8B and 8C. The camera module 20 is bonded to the FPC substrate 3 at the same time as the components mounting process in which other electric components not shown are mounted on the FPC substrate 3. Firstly as shown in FIG. 8B, the camera module 20 is mounted on a specified bonding position of the FPC substrate 3. After mounting all the electric components, the FPC substrate 3 moves to a heat process. After that, it is heated to a predetermined temperature (for example 220° C.), and is soldered and bonded. The heating condition is retained for a specified time, the camera module 20 and the FPC substrate 3 are bonded as shown in FIG. 8C. The substrate module 30 is bonded to the FPC substrate 3 by a solder ball 31a, and is electrically conducted by a circuit electrode (not shown). The bonding to the FPC substrate 3 may be done by a conductive resin adhesive.

The lenses 7 are formed of resin. As the resin material, a heat-resistant optical resin material including a silicon resin, an epoxy resin, and a polysulfone resin can be used because it needs to be optically transparent. Further, the heat-resistant resin materials, which are the heat-resistant optical resin material added with inorganic particulate material for adjusting a reflective index, a temperature dependence of the reflective index, and a coefficient of thermal expansion etc, may be used. Furthermore, a resin material etc such as a polycarbonate, a norbornene amorphous polyolefin, acrylic, or an olefin maleimide resin added with inorganic particulates for improving a heat resistance may be used.

For the lens holder 32, in addition to the materials used for the lens 7, a heat-resistant engineering resin including a polyamid, a polyimid, a polyamid-imid, a polyether sulfone, a polyetherimide, a polyarylate, a polysulfone, a polyphthalamide, a polyphthalimid, a liquid crystal polymer, and an epoxy resin may be used.

These resins must endure the heat when soldered and bonded in a batch as in reflow. Considering the needs for employing a nonleaded solder in recent years, the heat-resistant temperature is preferably 200° C. or more, and more preferably 250° C. or more. To fix the lens unit 40 and the substrate module 30, a method to bond them by an adhesive is used. In this case also, a heat-resistant adhesive such as an epoxy or an acrylic adhesive is preferably used in order to endure the batch soldering and bonding such as a reflow. The method to adhere may be a photo-curing, a heat-curing, or both.

The method to bond the lens unit 40 and the substrate module 30 is not limited to the adherence. For example a method to use both of the adherence and a caulking may be used. Specifically, a pin is provided below the lens holder 32 for positioning and temporarily jointing, and a hole for putting the pin through is provided on a portion corresponding to the substrate module 30. It is possible to use a bonding method in which the pin is put through when the lens unit 40 and the substrate module 30 are combined together, and after the positioning, they are temporarily jointed by smashing the pin by an ultrasonic caulking device from the rear surface, and then they are bonded by the adhesive.

The lens holder 32 is constituted of a supporting portion for the lenses 7 and a portion for connecting the substrate module 30 that includes the solid-state imaging device 5. The lens holder 32 may be constituted of a plurality of members as described herein. Further, a metal layer such as Ni (nickel) or NiP (nickel-phosphorus) may be formed to the inner and the outer surface of the lens holder 32 by a vacuum evaporation or a sputter method in order to reduce the influence of an electromagnetic noise emitted from the substrate module 30.

The substrate module 30 may be a semiconductor itself such as Si (silicon) or GaAs (gallium arsenide) having the solid-state imaging device 5 formed therein, or may be a different substrate or the like having the solid-state imaging device 5 attached thereto.

The cover glass 9 in the substrate module 30 preferably has the thinner thickness in light of the optical characteristic. This is because that with the thicker cover glass 9, the distance from the lens 7 to the solid-state imaging device 5 becomes longer and thereby influencing the optical characteristic. Accordingly, the thickness of the cover glass 9 is preferably being 0.3 mm or less.

In the batch soldering and bonding in the reflow etc for bonding the camera module 20 to the FPC substrate 3, the camera module 20 passes a high temperature portion over 200° C. such as a reflow oven while the camera module 20 is bonded to the FPC substrate 3. Accordingly the pressure inside the camera module 20 becomes 1.5 or 2 times more than in the normal temperature for several seconds to a few minutes. By the increase of the pressure, the lens unit 40 may come off from the substrate module 30, or the optical axis of the lens 7 may be shifted. To eliminate the pressure difference, a small hole may be provided on the sidewall of the lens unit 40 so as to adjust the pressure difference between inside and outside of the lens unit 40. The hole is preferably closed after bonding the camera module 30 to the FPC substrate 3. This is because that dusts from outside get inside and attached over the solid-state imaging device 5, causing defects or the like. Furthermore, it is possible to prevent a large dust from getting in by making the diameter of the hole to approximately 10 μm because the hole is only to adjust the pressure difference.

The camera module according to this embodiment is further described in detail hereinafter.

As shown in FIG. 7, the height of the lens unit 40H is preferably 3.5 mm or less. Note that the height of the lens unit 40H is equal to the distance from the upper end (the lens-side end) of the lens holder 32 to the top surface (the lens-side surface) of the cover glass 9. If the temperature is not consistent across the lens unit 40 due to the heat at the batch soldering and bonding such as the reflow, the lens unit 40 is distorted. Accordingly the optical axis is shifted by the lens 7 being tilted. Consequently, the aberration becomes larger, inducing optical problems such as the image getting blur and the distortion around the image becoming larger. To prevent the problems caused by such distortion, the lens unit is preferably heated evenly. The inventors have found that as a result of studies from evaluation test, the batch soldering and bonding such as the reflow with better mass productivity can be performed by making the height of the lens unit to be 3.5 mm or less. The evaluation tests are described later in detail.

Further, assuming that the height of the lens unit 40 to be H and the area for adhering the lens holder 32 to the cover glass 9 to be S, the inventors have found that H and S are preferably as in the following formula (1).

$$0.05 \leq S/(H \times H) \tag{1}$$

By making them to be the condition of the formula (1), the degree of the lens unit coming off or shifting from the substrate is reduced even when the lens unit 40 is given an impact such as being dropped. Accordingly by the impact including a drop, the moment to the lens unit becomes large, thereby making it easier to come off.

Further, it is not preferable to have thicker walls of the lens holder 32 and the outer peripheral portions of the lens holder 32, because the size of the camera module 20 itself becomes large. Accordingly, the upper limit of the S and H is enough as in the following formula (2).

$$S/(H \times H) \leq 1 \tag{2}$$

Furthermore, the relationship between the coefficient of thermal expansion of the resin material of the lens 7 and that of the lens holder 32 that holds the lens is preferably be as in the following formula (3), in light of the heating at the batch soldering and bonding such as the reflow.

$$1 < \alpha 1/\alpha 2 \leq 20 \tag{3}$$

Here, the coefficient of thermal expansion of the resin material of the lens 7 is indicated by $\alpha 1$, and the coefficient of the thermal expansion of the material of the lens holder 32 that holds the lens is indicated by $\alpha 2$.

As shown in the formula (3), by making the coefficient of the thermal expansion of the resin material of the lens 7 $\alpha 1$ larger than the coefficient of the thermal expansion of the resin material of the lens holder 32, the lens 7 always pushes the lens holder when heated in the batch soldering and bonding. Accordingly the position of the lens 7 does not easily shift against the lens holder 32. However, if $\alpha 1/\alpha 2$ becomes larger than 20, the distortion applied to the lens 7 and the lens holder 32 becomes excessively large when heated, there are problems induced such that the lens 7 and the lens holder 32 are distorted or the fixed position of the lens 7 is shifted. Accordingly it is preferable to select a resin material in a range of the formula (3). The $\alpha 1/\alpha 2$ shown in the formula (3) is preferably more or equal to 1.5, and more preferably more or equal to 2.

As described in the foregoing, since the material having a heat-resistant temperature higher than the heating temperature at the batch soldering and bonding represented by the reflow, the lens unit will not be damaged by heat in the heating process. Accordingly the camera module 20 is able to be mounted on the FPC substrate 3 at the same time with other electric component. Accordingly it is possible to improve the productivity in a mass production.

Further, it is possible to provide a camera module with a high resistance to the impact including a drop by making the height of the lens unit to be 3.5 mm or less and the structure of the camera to satisfy the conditions of the formulas (1) and (2).

Furthermore, by making the coefficient of thermal expansion of the resin material of the lens and that of the lens holder material to satisfy the condition of the formula (3), camera images can be improved because it becomes more difficult to shift the optical axis of the lens against the sensor and aberration is reduced.

Figure 9:
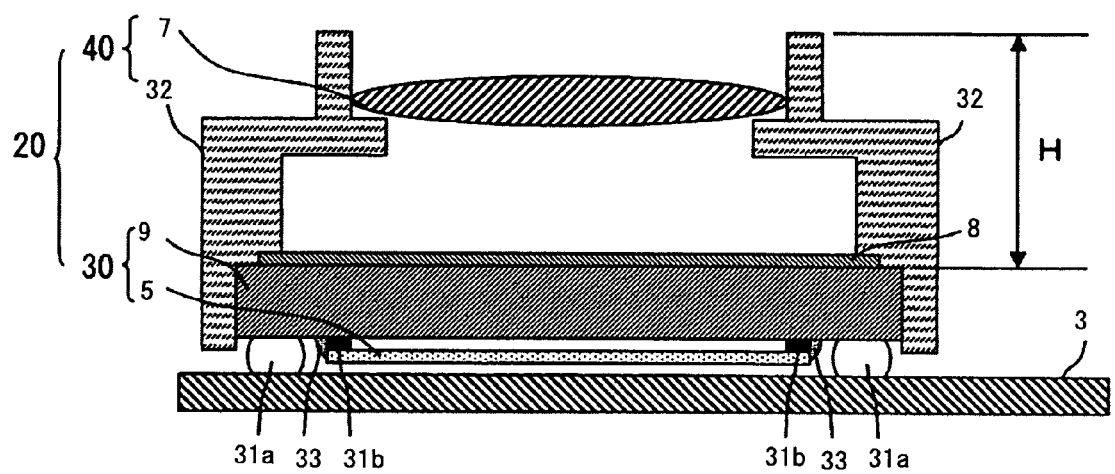
FIG. 9 is a schematic cross-sectional view showing a camera module used in evaluation tests of examples 1 to 3.

The evaluation tests that have drawn the results of the formulas (1) and (2) are described hereinafter in detail. Firstly the evaluation test for the examples 1 to 3 and a comparative example 1 for the examples 1 to 3 are described hereinafter in detail. The evaluation test for the examples 1 to 3 and the comparative example 1 is conducted by the camera module having a cross-section structure of FIG. 9. For the solid-state imaging device 5, a CMOS censor of ⅛ inch size with the number of pixels 300,000 is used.

A liquid crystal polymer is used for the lens holder 32, and the lens 7 is a single aspheric lens, which is formed of Si resin. For the liquid crystal polymer material, "SIVERAS" made by Toray Industries, Inc. or "VECTRA" made by Polyplastics Co., Ltd. is used. A groove is formed in the lens holder 32 so as to hold the injected lens 7. After pressing the lens 7 into the groove, the lens 7 and the lens holder 32 are bonded by the heat-curing epoxy adhesive having two types of liquid mixed together. Similarly to adhere the lens holder 32 and the cover glass 9 of the substrate module 30, the heat-curing epoxy adhesive having two types of liquid mixed together.

The height (H) from the top surface of the lens holder 32 to the top surface of the cover glass 9 is fixed to 3 mm. 10,000 camera module samples are created for each condition of the lens holder 32 thickness. Conditions for the lens holder 32 thickness for the examples 1 to 3 and the comparative example 1 for the examples 1 to 3 are described below.

EXAMPLE 1

For a camera module of the first embodiment, the thickness of the lens holder 32 is created under the following condition. The configuration of the camera module is same as the one shown in FIG. 9.

$S/(H \times H) = 0.1$

EXAMPLE 2

For a camera module of the second embodiment, the thickness of the lens holder 32 is created under the following condition. The configuration of the camera module is same as the one shown in FIG. 9.

$S/(H \times H) = 0.2$

EXAMPLE 3

For a camera module of the third embodiment, the thickness of the lens holder 32 is created under the following condition. The configuration of the camera module is same as the one shown in FIG. 9.

$S/(H \times H) = 0.3$

EXAMPLE 4

For a camera module of the fourth embodiment, the thickness of the lens holder 32 is created under the following condition. The configuration of the camera module is same as the one shown in FIG. 9.

$S/(H \times H) = 0.45$

Comparative Example 1

For a camera module of the first comparative example, the thickness of the lens holder is created under the following condition. In the following conditions, the thickness of the outside wall of the lens holder 32 is thinner as compared to the examples 1 to 4. The configuration of the camera module is same as the one shown in FIG. 9.

$S/(H \times H) = 0.03$

The 10,000 camera modules of the comparative example 1 are mounted on the FPC substrate 3 having a wiring pattern formed thereon to enable the evaluation of the camera image together with other devices such as a resistance, a capacitor and an IC which are normally bonded with FPC substrate 3, and then bonded in the reflow oven. The heat profile of the reflow oven is that a preheating at 170° to 190° C. for 60 seconds, and then heated at 220° to 240° C. for 30 seconds. After being heated, the mounted circuit substrate is taken out from the reflow oven.

After the reflow, the camera appearance and images are examined. To examine the images, a test chart is shot by the camera module and the image is examined by a visual observation. Then a drop test for the mounted circuit substrate is performed thereafter. When directly dropping the mounted circuit substrate, the circuit substrate itself is damaged. Therefore it is fixed in an aluminum case in a rectangular solid shape one by one to apply the drop test. In the drop test, it is dropped from the height of 1.5 m for each of surfaces thereof. After the drop test, the appearance and the images of the camera unit are examined in the similar manner. The results are shown in a table 1.

TABLE 1

|  | H [mm] | S/(H × H) | Defective Fraction After Passing Reflow Oven | | Defective Fraction After Being Dropped | |
| --- | --- | --- | --- | --- | --- | --- |
|  |  |  | Appearance | Image | Appearance | Image |
| Example 1 | 3.0 | 0.1 | 3 | 5 | 4 | 5 |
| Example 2 | 3.0 | 0.2 | 4 | 6 | 4 | 6 |
| Example 3 | 3.0 | 0.3 | 6 | 8 | 7 | 9 |
| Example 4 | 3.0 | 0.4 | 7 | 10 | 10 | 15 |
| Comparative Example 1 | 3.0 | 0.03 | 10 | 15 | 20 | 30 |

Assuming that the height of the lens unit 40 to be H and the adhering area of the lens unit 40 to adhere to the cover glass 9 to be H, by making $0.05 \leq /(H \times H)$, it has been found that defective fraction of a camera can be reduced, as a result of the mounting test in the reflow oven and the drop test.

Next, the evaluation test for examples 5 to 7 and the comparative example 2 for the examples 5 to 7 is described hereinafter. The evaluation test for examples 5 to 7 and the comparative example 2 is performed in the camera module having a cross-section structure of FIG. 10. For the solid-state imaging device 5, a CMOS sensor of ⅛ inch size with the number of pixels 300,000 is used.

A liquid crystal polymer is used for the lens holder 32, and the lens 7 is a single aspheric lens, which is a formed of Si resin. After creating the lens 7 by forming a resin, the lens 7 is put into a metal mold of the lens unit 40 to create the lens unit 40 having the lens holder 32 integral with the lens 7 by the insert molding method. To adhere the lens holder 32 and the substrate module 30, a heat-curing epoxy adhesive having two types of liquid to be mixed is used.

The thickness of the adherence between the lens holder 32 and the substrate module 30 is made to be 0.1 mm and the adhering area S is made to be fixed. Further, a metal mold and 10,000 sample camera modules are created for each condition of the height (H) from the top surface of the lens unit 40 to the top surface of the substrate module 30, and the thickness of the lens holder. The shape of the lens surface is optimally designed to optimize the performance in each height, and the metal mold is manufactured correspondingly to manufacture the lenses.

Figure 10:
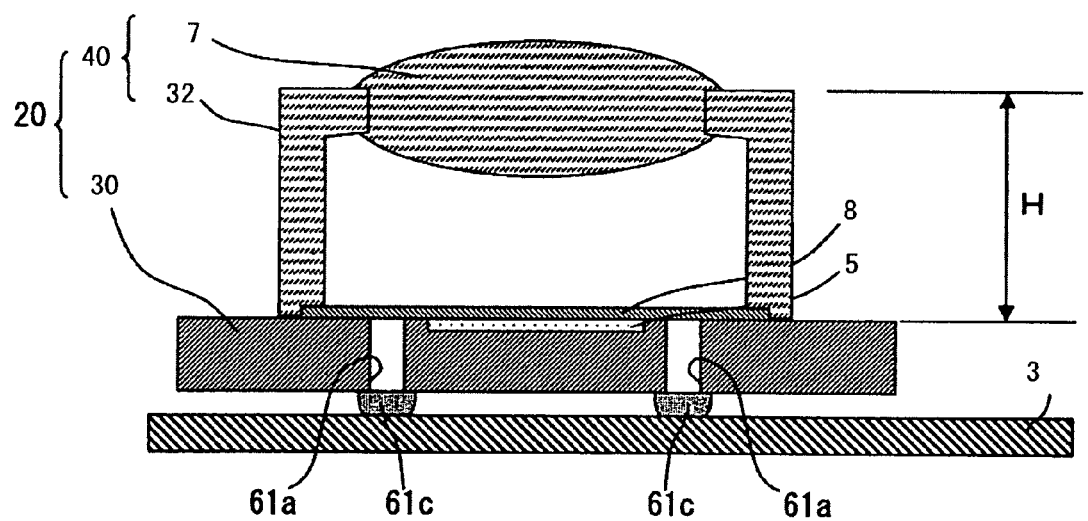
FIG. 10 is a schematic cross-sectional view showing a camera module used in evaluation tests of examples 5 to 7.

The camera module of FIG. 10 is described hereinafter in detail. As shown in FIG. 10, the camera module includes the FPC substrate 3, the substrate module 30, the lens unit 40, and the optical filter 8. The camera module 20 is comprised from the substrate module 30 and the lens unit 40. As shown in FIG. 10, the camera module 20 is comprised from the substrate module 30 having the solid-state imaging device 5 thereover, and the lens unit 40. By the substrate module 30 being bonded to the FPC substrate, the entire camera module 20 is bonded to the FPC substrate 3.

The substrate module 30 is a plate shaped semiconductor substrate (wafer) having the solid-state imaging device 5, such as a CCD or CMOS which are an imaging device for imaging, is formed thereover. A wiring pattern for connections (not shown) is given to inside and outside of the wafer. Further, a conductive layer such as a metal plating is formed inside a through-hole 61$a$ formed in the wafer. The wirings of inside and outside the wafer are electrically connected by the through-hole 61$a$. The solid-state imaging device 5 includes a light-receiving portion having many pixels disposed in a lattice for conducting photoelectric conversion. By providing an image to the light-receiving portion of the solid-state imaging device 5, charges are accumulated to each pixel. The charges stored are output as an image signal from the solid-state imaging device. The substrate module 30 is bonded to a circuit electrode not shown of the FPC substrate 30 by a solder ball 61$c$. The bonding of the substrate module 30 and the FPC substrate 3 is not limited to the method using the solder ball 61$c$. The substrate module 30 and the FPC substrate 3 may be bonded using a conductive resin adhesive.

The lens unit 40 includes the lens 7 and the lens holder 32. The lens 7 and the lens holder 32 are made integral with each other. A recessed portion is provided at the lower end of the lens holder 32. The lens holder 32 is fixed to the substrate module 30 with the optical filter 8 therebetween. The optical filter 8 is positioned by the notches of the lens holder 32. The lens unit 40 is formed with the lens 7 integral with the lens holder 32. Accordingly the lens unit 40 has a high airtightness. The solid-state imaging device 5 is sealed by the lens unit 40 adhering to the substrate module 30. A glass plate may be disposed over the wafer. When using the glass plate, it is possible to form the optical filter 8 over the glass plate. In such case, the number of components is reduced.

The height of the lens unit 40 is 3.5 mm or less. The temperature around the lens unit 40 is set being standerlized, thereby enabling to perform the batch soldering and bonding including the reflow with high productivity.

Assuming that the height of the lens unit 40 to be H and the adhering area of the lens holder 32 being adhered to the substrate module 30 in this camera module to be S, H and S satisfy the abovementioned formula (1). By making them to be the condition of the formula (1), the degree of the lens unit coming off or shifting from the substrate module 30 is reduced even when the lens unit 40 is given an impact such as being dropped.

Further, it is not preferable to have thicker walls of the lens holder 32 and the outer peripheral portions of the lens holder 32, because the size of the camera module 20 itself becomes large. Accordingly, the upper limit of the S and H is enough as in the abovementioned formula (2).

Furthermore, the relationship between the coefficient of thermal expansion of the resin material of the lens 7 and that of the lens holder 32 that holds the lens preferably satisfies the formula (3), in light of the heating at the batch soldering and bonding such as the reflow. Here, the coefficient of thermal expansion of the resin material of the lens 7 is indicated by $\alpha 1$, and the coefficient of the thermal expansion of the material of the lens holder 32 that holds the lens is indicated by $\alpha 2$. The $\alpha 1/\alpha 2$ shown in the formula is preferably more or equal to 1.5, and more preferably more or equal to 2.

Conditions for the height (H) for the examples 5 to 7 and the comparative example 2 for the examples 5 to 7 are described below.

EXAMPLE 5

A camera module of the fifth embodiment is created with the height (H) from the top surface of the lens unit 40 to the substrate module 30 is 3.5 mm, and the thickness of the lens holder 32 is under the following condition. The configuration of the camera module is same as the one shown in FIG. 10.

$S/(H \times H) = 0.06$

EXAMPLE 6

A camera module of the sixth embodiment is created with the height (H) from the top surface of the lens unit 40 to the substrate module 30 is 3.0 mm, and the thickness of the lens holder 32 is under the following condition. The configuration of the camera module is same as the one shown in FIG. 10.

$S/(H \times H) = 0.08$

EXAMPLE 7

A camera module of the sixth embodiment is created with the height (H) from the top surface of the lens unit 40 to the substrate module 30 is 3.0 mm, and the thickness of the lens holder 32 is under the following condition. The configuration of the camera module is same as the one shown in FIG. 10.

$S/(H \times H) = 0.11$

Comparative Example 2

A camera module of the comparative example 2 is created with the height (H) from the top surface of the lens unit 40 to the substrate module 30 is 4.5 mm, and the thickness of the lens holder 32 is under the following condition. In the following condition, the outside wall of the lens holder 32 is thinner as compared to examples 5 to 7. The configuration of the camera module is same as the one shown in FIG. 10.

$S/(H \times H) = 0.03$

The 10,000 camera modules of the examples 5 to 7 and the comparative example 2 are mounted on the FPC substrate 3 having a wiring pattern formed thereon to enable the evaluation of the camera image together with other resistance normally bonded, a capacitor and an IC. Then the camera module is bonded to the FPC substrate 3 in the reflow process. The heat profile of the reflow oven is that a preheating at 170° to 190° C. for 60 seconds, and then heated at 220° to 240° C. for 30 seconds. After being heated, the mounted circuit substrate is taken outside from the reflow oven.

After being mounted in the reflow C oven, the camera appearance and images are examined. To examine the images, a test chart is shot by the camera module and the image is examined by a visual observation. Then a drop test for the mounted circuit substrate is performed thereafter. When directly dropping the mounted circuit substrate, the circuit substrate itself is damaged. Therefore it is fixed in an aluminum case in a rectangular solid shape one by one to apply the drop test. In the drop test, it is dropped from the height of 1.5 m for each of surfaces thereof. After the drop test, the appearance and the images of the camera unit are examined in the similar manner. The results are shown in a table 2.

TABLE 2

|  | H [mm] | S/(H × H) | Defective Fraction After Passing Reflow Oven | | Defective Fraction After Being Dropped | |
| --- | --- | --- | --- | --- | --- | --- |
|  |  |  | Appearance | Image | Appearance | Image |
| Example 5 | 2.5 | 0.11 | 3.3 | 4.5 | 3.9 | 4.8 |
| Example 6 | 3 | 0.08 | 4 | 5 | 4 | 7 |
| Example 7 | 3.5 | 0.06 | 7 | 9 | 8 | 10 |
| Comparative Example 2 | 4.5 | 0.03 | 12 | 18 | 25 | 38 |

It is found that as a result of the mounting test in the reflow oven and the drop test as in a table 2, defective fraction of a camera can be reduced by making the height of the lens unit 40 to be 3.5 mm or less.

By the way, a glass can be considered to use for the lens. However the density of the glass is larger than that of the resin. Thus the weight of the camera module is heavier. Accordingly the lens can easily come off by an impact when the device having the camera is dropped down to the ground or when the device is stricken against an object.

To make the lens hard to come off, the lens holder for supporting the lens needs to be strongly built. However in such case, the size of the camera itself becomes larger, losing its compactness. Furthermore, there is a problem that the glass lens itself is vulnerable to impacts and an excessive impact could cause the lens to be broken.

Furthermore, the coefficient of thermal expansion of the optical glass used as the lens is about $0.5 \times 10^{-5}$ to $1 \times 10^{-5}$. On the other hand, an average coefficient of thermal expansion of the resin material used for the lens holder is $2 \times 10^{-5}$ to $10 \times 10^{-5}$, which is far larger than the glass. When being put into the reflow oven at the bonding process of the lens unit and the circuit substrate, the lens unit and the circuit substrate are heated close to 200° to 300° C. while being passed through. Therefore, the lens holder expands more than the lens, and the lens may move inside the lens holder due to the impact when moving it through the reflow oven, resulting the lens to be shifted. Consequently, the optical axis of the lens is shifted, inducing a problem that the aberration is generated and the images are deteriorated.

To resolve this problem, there is a method to use a glass or a metal such as a stainless having the coefficient of thermal expansion close to the glass for lens as the lens holder material. However the camera with the glass used for the lens holder is easy to be broken by an impact such as a drop as with the lens. Further, as the density of glass and the metal is larger than that of resin, the lens holder becomes heavier, and the connection between the lens holder and the sensor can easily come off by an impact being applied. Furthermore, for the glass lens holder, it needs to be formed using a mold. Thus it is formed in a high temperature and thereby having a lesser productivity as compared when formed of resin. On the other hand, in case of using the metal lens holder, it is formed using processes such as cutting, forging and pressing. In the process of cutting, it is manufactured one by one, thus having a lesser productivity. Whereas the forging and pressing is better in terms of the productivity, however there are problems including wrinkles and a lesser manufacturing accuracy. Thus they are not appropriate for the mass production of the lens holder for cameras.

Second Embodiment

Figure 11:
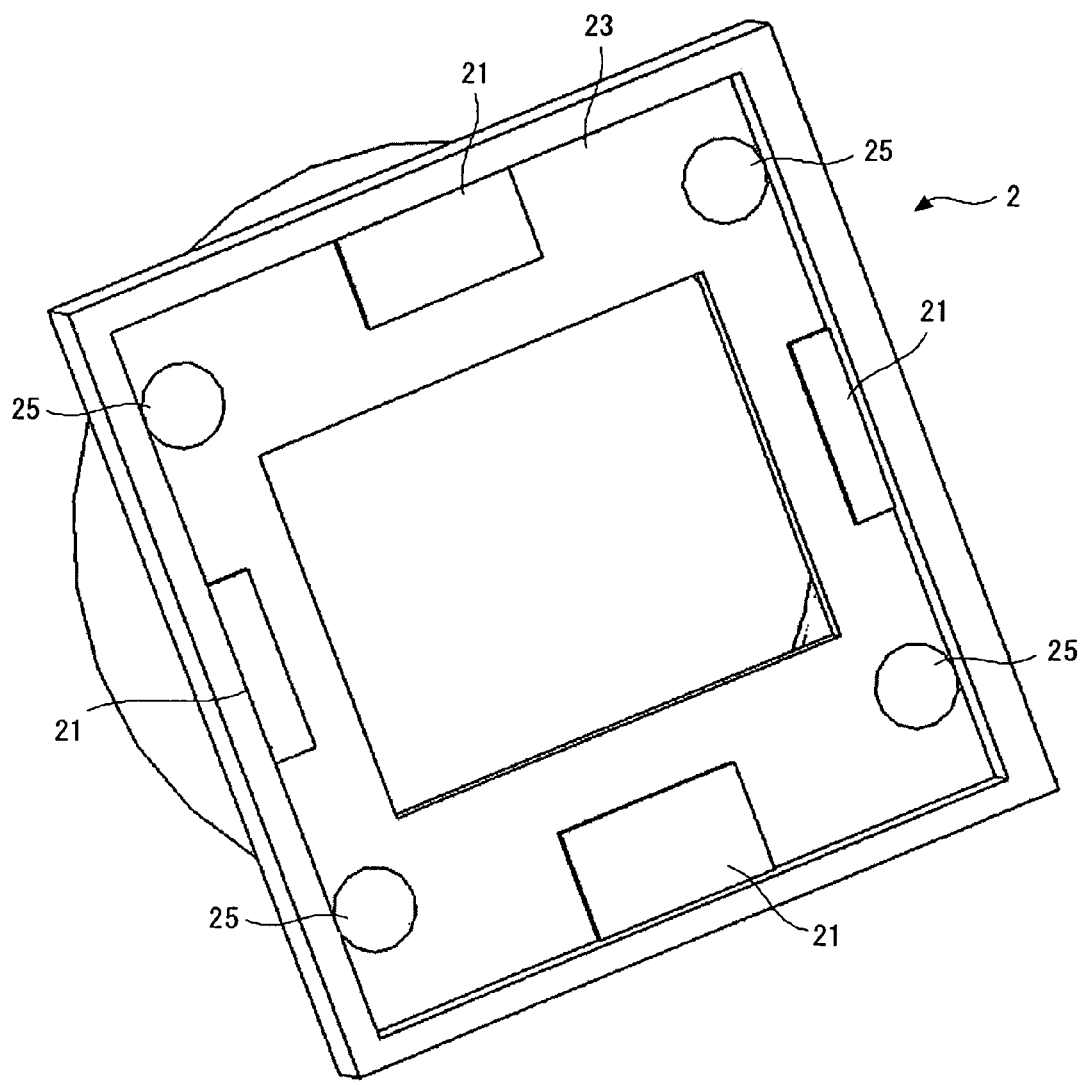
FIG. 11 is a schematic perspective view showing the mount of the camera module according to the present invention.

In the camera module according to the second embodiment of the present invention, the cover glass 9 and the mount 2 are fixed by the adhesive. However the cover glass 9 and the mount 2 are fixed while the cover glass 9 is in contact with the top portion of the ribs 21. Accordingly the cover glass 9 and the mount 2 are accurately positioned without being influenced by the adhesive. As shown in FIG. 11, four recessed portions 25 are provided on the mounting surface 23 of the mount 2. The mounting surface 23 is a place where the cover glass 9 is mounted on. The number of the recessed portions 25 is not limited to four as long as there it at least one. After applying an adhesive with a viscosity inside the recessed portions 25, the cover glass 9 is mounted on the mounting surface 23 and the adhesive is hardened by applying an ultraviolet and heat so as to fix the cover glass 9 and the mount 2.

In the second embodiment of the present invention, the adhesive between the cover glass 9 and the mounting surface 23 runs into the recessed portion 25 that functions as a region of refuge for the adhesive. Accordingly it is possible to prevent the optical performance to be reduced by the adhesive running into the region where an incident light passes.

Third Embodiment

Figure 12:
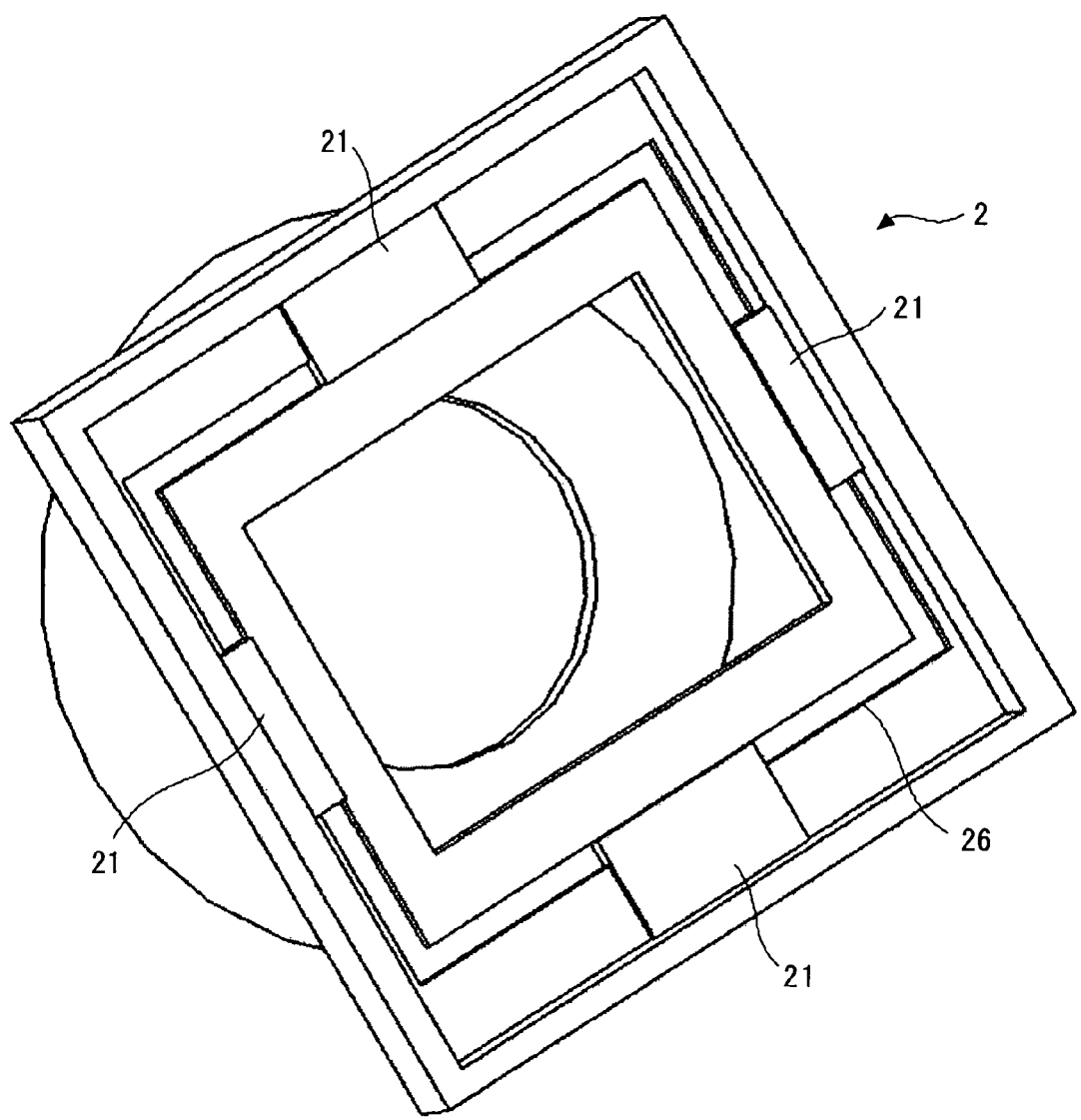
FIG. 12 is a schematic perspective view showing the mount of the camera module according to the present invention.

For the mount 2 of the camera module according to a third embodiment of the present invention, four recessed portions 26 are formed to the mounting surface 23 of the cover glass 9, as shown in FIG. 12. The recessed portions 26 are provided on regions other than the ribs 21.

As described in the foregoing, in the third embodiment of the present invention, the recessed portions 26 are provided instead of the recessed portions 24 of the first embodiment. The adhesive between the optical filter and the mounting surface 23 of the mount 2 runs into the recessed portions 26 functioning as a region of refuge for the adhesive. Accordingly it is possible to prevent the optical performance to be reduced by the adhesive running into the region where an incident light passes.

Fourth Embodiment

Figure 13:
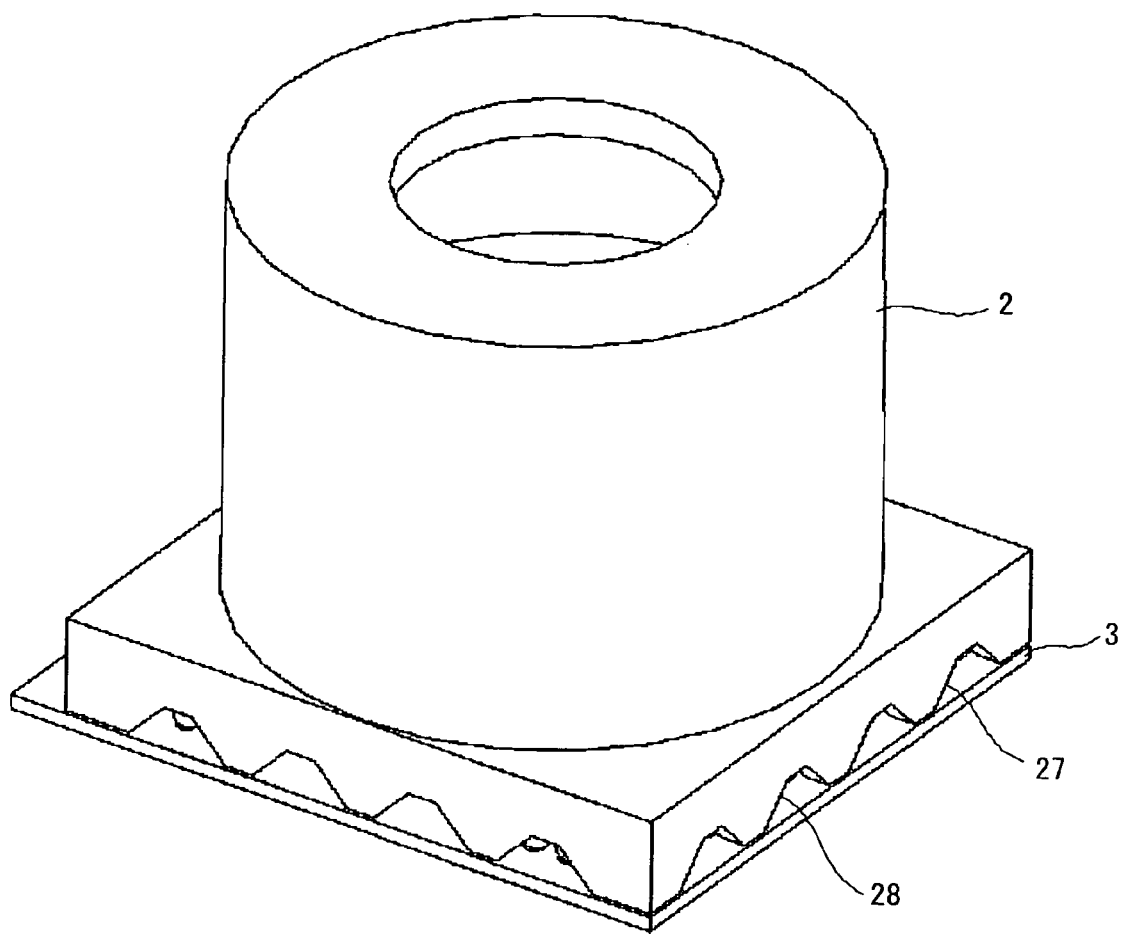
FIG. 13 is a schematic perspective view showing the mount and a substrate of the camera module according to the present invention.
Figure 14:
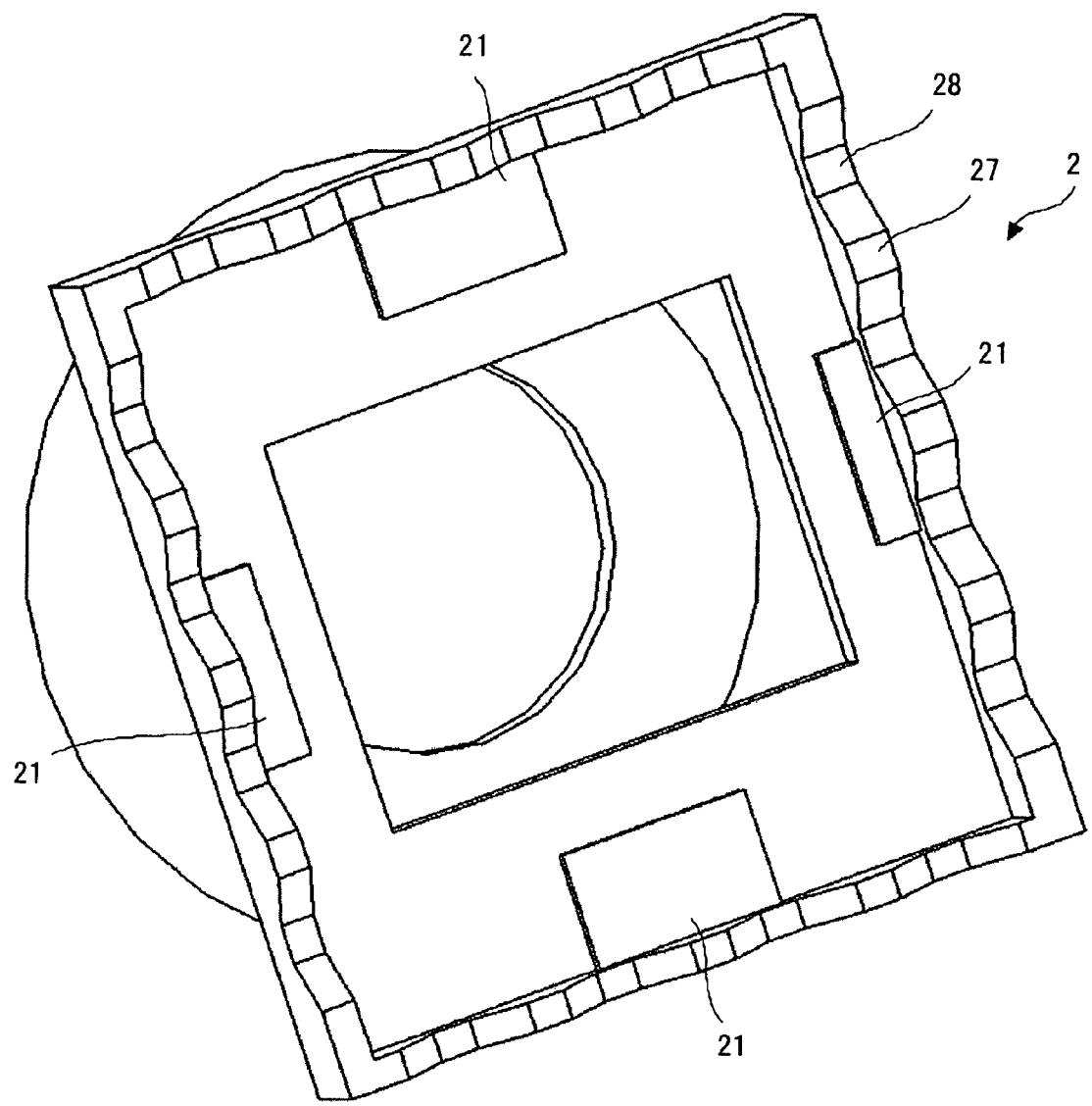
FIG. 14 is a schematic perspective view showing the mount of the camera module according to the present invention.

As shown in FIGS. 13 and 14, a plurality of grooves (recessed portions) 28 are formed at the lower end of the mount 2 of the camera module according to a fourth embodiment of the present invention. The groove 28 extends along the optical axis of the lens 7. In other words, the groove 28 extends along the direction, which crosses the extending direction of the lower end 27 of the mount 2. The groove 28 is provided across the entire width of the lower end 27 of the mount 2. The recessed portions are formed at each side of the lower end 27 of the mount 2.

As described in the foregoing, in the fourth embodiment of the present invention, by providing the groove 28, the adhering area between the mount 2 and the FPC substrate 3 can be increased. Especially, the groove 28 extends along the optical axis of the lens 7. So, it is further possible to increase the adhesive intensity. Accordingly it is easier to form the groove 28 even when the width of the lower end 27 is reduced, as compared to a case in which the groove 28 extends along a direction horizontal to the extending direction of the lower end 27. It is of a great significance to provide the recessed portion as in the fourth embodiment because the width of the lower end 27 is becoming to be smaller along with the downsizing of camera modules.

Figure 15:
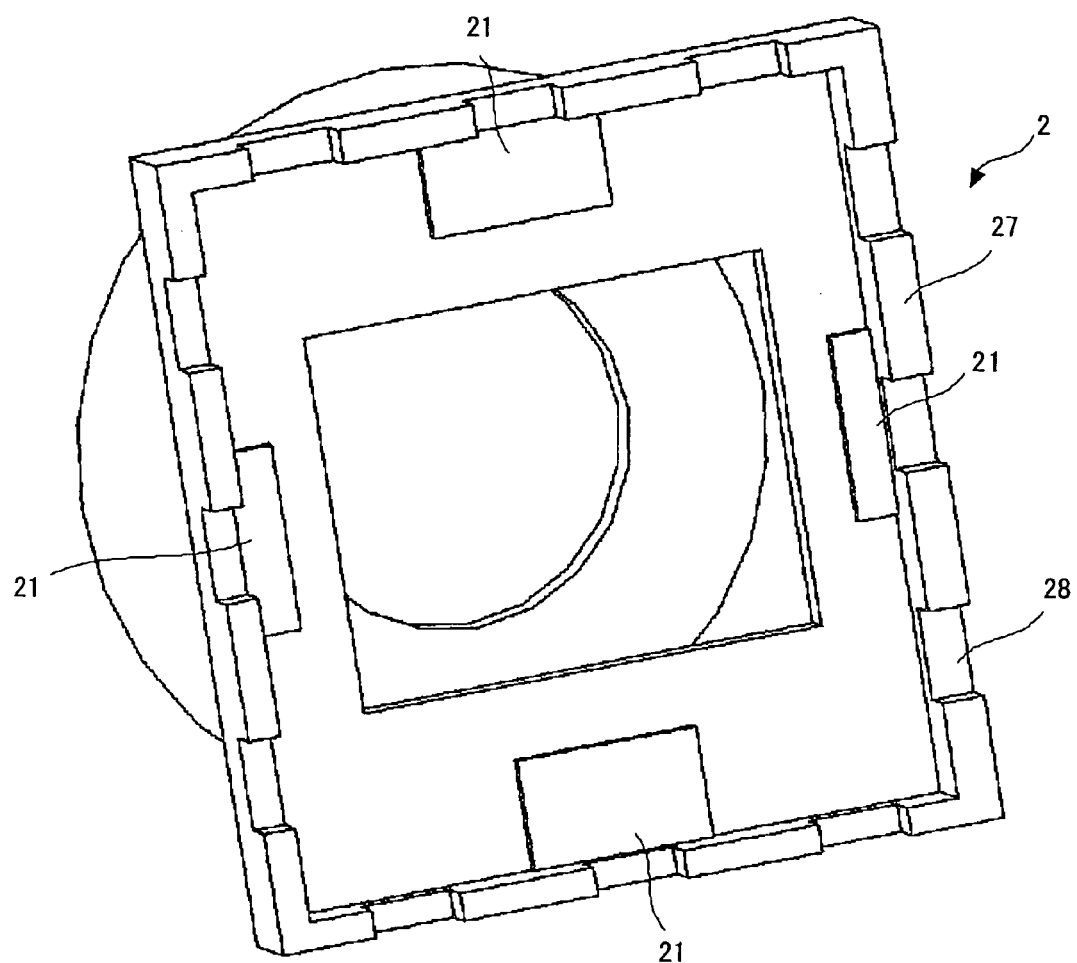
FIG. 15 is a schematic perspective view showing the mount of the camera module according to the present invention.

In the examples shown in FIGS. 13 and 14, the side surface of the groove 28 is inclined. However as shown in FIG. 15, the side surface may be vertical to the FPC substrate 3 to be mounted (specifically, horizontal to the optical axis of the lens 7). In this case, the lower end 27 has a plurality of recessed portion.

Furthermore, the grooves 28 may be formed in circular arcs from a consecutive surface as long as they increase the adhered surface.

From the invention thus described, it will be obvious that the embodiments of the may be varied in many ways. Such variations are not to be regarded as a departure from the spirit and scope of the invention, and all such modifications as would be obvious to one skilled in the art are intended for inclusion within the scope of the following claims.

What is claimed is:

1. A camera module comprising:
a substrate module that comprises an imaging device having a pixel where photo-electric conversion is conducted, and a substrate to which the imaging device is fixed;
a lens that is formed of a resin material having a heat-resistance temperature higher than a heating temperature in a mounting process of an electric component, and transfers an image to the imaging device; and
a lens holder that holds the lens directly or indirectly and that is formed of a resin material having a heat-resistance temperature higher than the heating temperature in the mounting process of the electric component, the lens holder being coupled to the substrate module;
wherein a coefficient of thermal expansion of a material of the lens is $\alpha 1$ and a coefficient of thermal expansion of a material of a portion of the lens holder for holding the lens is $\alpha 2$, and a relationship of $1<\alpha 1/\alpha 2 \leq 20$ is satisfied.

2. The camera module according to claim 1, wherein the lens and the lens holder have a heat-resistance temperature of 250° C. or more.

3. The camera module according to claim 1, wherein the material of the lens is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

4. The camera module according to claim 1, wherein the material of the lens holder is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or at least one of a resin material including a polyamid, a polyimid, a polyamid-imid, a polyether sulfone, a polyetherimide, a polyarylate, a polyphthalamide, a polyphthalimid, and a liquid crystal polymer.

5. The camera module according to claim 1, wherein a following formula is satisfied $$0.05 \leq S/(H \times H)$$

wherein S is an area of a connecting portion of the lens and the substrate module, and
H is a distance between a lens-side end of the lens holder and a lens-side plane of the substrate.

6. The camera module according to claim 1, wherein a following formula is satisfied $$S/(H \times H) \leq 1$$

wherein S is an area of a connecting portion of the lens and the substrate module, and
H is a distance between a lens-side end of the lens holder and a lens-side plane of the substrate.

7. The camera module according to claim 1, wherein a relationship of $1.5<\alpha 1/\alpha 2 \leq 20$ is satisfied.

8. The camera module according to claim 7, wherein a relationship of $2<\alpha 1/\alpha 2 \leq 20$ is satisfied.

9. The camera module according to claim 1,
wherein the substrate has a transparency; and
the imaging device is fixed to a surface opposite to a surface of the substrate on which the lens holder is mounted.

10. The camera module according to claim 1, wherein the lens holder comprises a lens module that holds the lens and a mount that holds the lens module and the lens holder is fixed to the substrate module.

11. A mobile terminal device comprising:
the camera module according to claim 1;
a circuit substrate on which the camera module is mounted through a reflow process; and
a plurality of bumps that are provided on a surface of the substrate, and the plurality of bumps secures an electrical connection between the imaging device and the circuit substrate.

12. A camera module comprising:
a substrate module that comprises an imaging device having a pixel where photo-electric conversion is conducted, and a substrate to which the imaging device is fixed;
a lens that provides an image to the imaging device, the lens being formed of a resin material having a heat-resistance temperature higher than a heating temperature in a mounting process of an electric component; and
a lens holder that holds the lens directly or indirectly, the lens holder being coupled to the substrate module and being formed of a resin material having a heat-resistance temperature higher than the heating temperature in the mounting process of the electric component,
wherein the lens and the lens holder are formed of a resin material having a heat-resistance temperature of 200° C. or more and a following formula is satisfied $$0.05 \leq S/(H \times H)$$

wherein S is an area of a connecting portion of the lens and the substrate module, and
H is a distance between a lens-side end of the lens holder and a lens-side plane of the substrate.

13. The camera module according to claim 12, wherein the lens and the lens holder have a heat-resistance temperature of 250° C. or more.

14. The camera module according to claim 12, wherein the material of the lens is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

15. The camera module according to claim 12, wherein the material of the lens holder is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or at least one of a resin material including a polyamid, a polyimid, a polyamid-imid, a polyether sulfone, a polyetherimide, a polyarylate, a polyphthalamide, a polyphthalimid, and a liquid crystal polymer.

16. The camera module according to claim 12, wherein a coefficient of thermal expansion of a material of the lens is $\alpha 1$ and a coefficient of thermal expansion of a material of a portion of the lens holder for holding the lens is $\alpha 2$, and a relationship of $1<\alpha 1/\alpha 2 \leq 20$ is satisfied.

17. The camera module according to claim 16, wherein a relationship of $1.5<\alpha 1/\alpha 2 \leq 20$ is satisfied.

18. The camera module according to claim 17, wherein a relationship of $2<\alpha 1/\alpha 2 \leq 20$ is satisfied.

19. The camera module according to claim 12, wherein the distance H between the lens-side end of the lens holder and the lens-side plane of the substrate is equal to 3.5 mm or less.

20. The camera module according to claim 12, wherein the lens holder comprises a lens module that holds the lens, and a mount that holds the lens module and the lens holder is fixed to the substrate module.

21. A mobile terminal device comprising:
the camera module according to claim 12;
a circuit substrate on which the camera module is mounted through a reflow process; and
a plurality of bumps that are provided on a surface of the substrate, and the plurality of bumps secures an electrical connection between the imaging device and the circuit substrate.

22. A camera module comprising:
a substrate module that comprises an imaging device having a pixel where photo-electric conversion is conducted, and a substrate to which the imaging device is fixed;
a lens that provides an image to the imaging device, the lens being formed of a resin material having a heat-resistance temperature higher than a heating temperature in a mounting process of an electric component; and
a lens holder that holds the lens directly or indirectly, the lens holder being coupled to the substrate module and being formed of a resin material having a heat-resistance temperature higher than the heating temperature in the mounting process of the electric component,
wherein the lens and the lens holder are formed of a resin material having a heat-resistance temperature of 200° C. or more and a following formula is satisfied $$S/(H \times H) \leq 1$$

wherein S is an area of a connecting portion of the lens and the substrate module, and
H is a distance between a lens-side end of the lens holder and a lens-side plane of the substrate.

23. The camera module according to claim 22, wherein the lens and the lens holder have a heat-resistance temperature of 250° C. or more.

24. The camera module according to claim 22, wherein the material of the lens is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin.

25. The camera module according to claim 22, wherein the material of the lens holder is at least one of a heat resistant optical resin material including a silicon resin, an epoxy resin, and a polysulfone resin, or a resin material added with inorganic particulates to the heat resistant optical resin material, a polycarbonate, a norbornene amorphous polyolefin, an acrylic, or an olefin maleimide resin, or at least one of a resin material including a polyamid, a polyimid, a polyamid-imid, a polyether sulfone, a polyetherimide, a polyarylate, a polyphthalamide, a polyphthalimid, and a liquid crystal polymer.

26. The camera module according to claim 22, wherein a coefficient of thermal expansion of a material of the lens is al and a coefficient of thermal expansion of a material of a portion of the lens holder for holding the lens is $\alpha 2$, and a relationship of $1<\alpha 1/\alpha 2 \leq 20$ is satisfied.

27. The camera module according to claim 26, wherein a relationship of $1.5<\alpha 1/\alpha 2 \leq 20$ is satisfied.

28. The camera module according to claim 27, wherein a relationship of $2<\alpha 1/\alpha 2 \leq 20$ is satisfied.

29. The camera module according to claim 22, wherein the distance H between the lens-side end of the lens holder and the lens-side plane of the substrate is equal to 3.5 mm or less.

30. The camera module according to claim 22, wherein the lens holder comprises a lens module that holds the lens, and a mount that holds the lens module and the lens holder is fixed to the substrate module.

31. A mobile terminal device comprising:
the camera module according to claim 22;
a circuit substrate on which the camera module is mounted through a reflow process; and
a plurality of bumps that are provided on a surface of the substrate, and the plurality of bumps secure an electrical connection between the imaging device and the circuit substrate.

32. A camera module that is mounted on a circuit substrate of an information terminal device, the camera module comprising:
an imaging device having a pixel where photo-electric conversion is conducted;
a substthte that holds the imaging device and is mounted onto the circuit substrate via a plurality of bumps that secures an electrical connection between the imaging device and the circuit substrate;
a lens that focuses an optical image to the imaging device; and
a lens holder that holds the lens directly or indirectly, the lens holder being coupled to the substrate,
wherein a material of the lens and the lens holder is a resin material of a heat-resistance temperature higher than a heating temperature in a mounting process of an electric component,
and wherein a following formula is satisfied $$0.05 \leq S/(H \times H)$$

where S is an area of a connecting portion of the lens and the substrate, and
H is a distance between a lens-side end of the lens holder and a lens-side plane of the substrate.

33. The camera module according to claim 32, wherein $S/(H \times H) \leq 1$ is satisfied.

34. The camera module according to claim 33, wherein wherein a coefficient of thermal expansion of a material of the lens is $\alpha 1$ and a coefficient of thermal expansion of a material of a portion of the lens holder for holding the lens is $\alpha 2$, and a relationship of $1 < \alpha 1/\alpha 2 \leqq 20$ is satisfied.

35. The camera module according to claim 32, wherein wherein a coefficient of thermal expansion of a material of the lens is $\alpha 1$ and a coefficient of thermal expansion of a material of a portion of the lens holder for holding the lens is $\alpha 2$, and a relationship of $1 < \alpha 1/\alpha 2 \leqq 20$ is satisfied.

36. The camera module according to claim 35, wherein a relationship of $1.5 < \alpha 1/\alpha 2 \leqq 20$ is satisfied.

37. The camera module according to claim 36, wherein a relationship of $2 < \alpha 1/\alpha 2 \leqq 20$ is satisfied.

38. The camera module according to claim 32, wherein the lens holder comprises a lens module that holds the lens, and a mount that holds the lens module and the lens holder is fixed to the substrate.

* * * * *